(12) United States Patent
Canim et al.

(10) Patent No.: US 11,308,083 B2
(45) Date of Patent: Apr. 19, 2022

(54) AUTOMATIC TRANSFORMATION OF COMPLEX TABLES IN DOCUMENTS INTO COMPUTER UNDERSTANDABLE STRUCTURED FORMAT AND MANAGING DEPENDENCIES

(71) Applicant: International Business Machines Corporation, Armonk, NY (US)

(72) Inventors: Mustafa Canim, Ossining, NY (US); Cristina Cornelio, White Plains, NY (US); Arun Iyengar, Yorktown Heights, NY (US); Ryan A. Musa, New York, NY (US); Mariano Rodriguez Muro, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 16/389,123

(22) Filed: Apr. 19, 2019

(65) Prior Publication Data

US 2020/0334251 A1    Oct. 22, 2020

(51) Int. Cl.
*G06F 16/00* (2019.01)
*G06F 16/2452* (2019.01)
(Continued)

(52) U.S. Cl.
CPC .... *G06F 16/24522* (2019.01); *G06F 16/2282* (2019.01); *G06F 16/2456* (2019.01);
(Continued)

(58) Field of Classification Search
None
See application file for complete search history.

(56) References Cited

U.S. PATENT DOCUMENTS 8,140,468 B2    3/2012    Kwok et al.
9,494,347 B2    11/2016   Stadermann et al.
(Continued)

OTHER PUBLICATIONS

Mustafa Canim et al., "Schemaless Queries over Document Tables with Dependencies" IBM Research, pp. 1-16 2019.
List of IBM Patents or Patent Applications Treated as Related.

*Primary Examiner* — Anhtai V Tran
(74) *Attorney, Agent, or Firm* — Fleit Intellectual Property Law; Jose Gutman

(57) ABSTRACT

An information processing system, a computer readable storage medium, and a computer-implemented method, collect tables from a corpus of documents, convert the collected tables to flattened table format and organized to be searchable by schema-less queries. A method collects tables, extracts feature values from collected table data and collected table meta-data for each collected table. A table classifier classifies each collected table as being a type of table. Based on the classifying, the collected table is converted to a flattened table including table values that are the table data and the table meta-data of the collected table. Dependencies of the data values are mapped. The flattened table and mapped dependencies are stored in a triple store searchable by schema-less queries. The table classifier learns and improves its accuracy and reliability. Dependency information is maintained among a plurality of database tables. The dependency information can be updated at variable update frequency.

19 Claims, 28 Drawing Sheets

(51) Int. Cl.
*G06F 16/2458* (2019.01)
*G06F 16/28* (2019.01)
*G06F 16/25* (2019.01)
*G06F 16/22* (2019.01)
*G06F 16/2455* (2019.01)
*G06F 40/157* (2020.01)

(52) U.S. Cl.
CPC ........ *G06F 16/2458* (2019.01); *G06F 16/252* (2019.01); *G06F 16/258* (2019.01); *G06F 16/285* (2019.01); *G06F 40/157* (2020.01)

(56) References Cited

U.S. PATENT DOCUMENTS

| | | |
|---|---|---|
| 2003/0229854 A1 | 12/2003 | Lemay |
| 2008/0059443 A1 | 3/2008 | Le Cam et al. |
| 2015/0309923 A1* | 10/2015 | Iwata .................... G06F 3/0611 711/105 |
| 2016/0292240 A1 | 10/2016 | Diwan et al. |
| 2017/0185662 A1 | 6/2017 | Huang et al. |
| 2017/0286508 A1 | 10/2017 | Gupta et al. |
| 2018/0246915 A1 | 8/2018 | Singh et al. |

\* cited by examiner

200

| | | | | Internal threaded fastener | | | | | | | | | | | | | | |
|---|---|---|---|---|---|---|---|---|---|---|---|---|---|---|---|---|---|---|
| | | | Material | CRES | | | | | | | | | | | | | | |
| | | | Finish | PASS | | | | | | | CAD | SIL | | | | | | W |
| | | | Lubrication | W | | CA | | DFL | | | CA | W | | CA | | | DFL | DFL |
| | Material | Finish | Lubrication | ITF1 | ITF2 | ITF3 | ITF4 | ITF5 | ITF6 | ITF7 | ITF8 | ITF9 | ITF10 | ITF11 | ITF12 | ITF13 | ITF14 |
| External threaded fastener | TI | RBC | W | ETF1 | C2 | C2 | C1 | C1 | C3 | C4 | C1 | * | C3 | C4 | C1 | C1 | C1 | C1 |
| | | | | ETF2 | C2 | C2 | C1 | C1 | C3 | C4 | C1 | * | C3 | C4 | C1 | C1 | C1 | C1 |
| | | | | ETF3 | C2 | C2 | C1 | C1 | C3 | C4 | C1 | * | C3 | C4 | C1 | C1 | C1 | C1 |
| | | IVD | CA | ETF4 | C3 | C3 | C3 | C3 | C3 | C3 | C3 | * | C3 | C3 | C3 | C3 | C3 | C3 |
| | | | | ETF5 | C2 | C2 | C1 | C1 | C3 | C4 | C1 | * | C3 | C4 | C1 | C1 | C1 | C1 |
| | | | | ETF6 | C2 | C2 | C1 | C1 | C3 | C4 | C1 | * | C3 | C4 | C1 | C1 | C1 | C1 |
| | | | | ETF7 | C2 | C2 | C1 | C1 | C3 | C4 | C1 | * | C3 | C4 | C1 | C1 | C1 | C1 |
| | | | | ETF8 | C2 | C2 | C1 | C1 | * | * | C1 | * | * | * | * | * | C1 | C1 |
| | | | | ETF9 | C2 | C2 | C1 | C1 | C3 | C4 | C1 | * | C3 | C4 | C1 | C1 | C1 | C1 |
| | | | | ETF10 | C2 | C2 | C1 | C1 | C3 | C4 | C1 | * | C3 | C4 | C1 | C1 | C1 | C1 |
| | | | | ETF11 | C2 | C2 | C1 | C1 | C3 | C4 | C1 | * | C3 | C4 | C1 | C1 | C1 | C1 |
| | | | | ETF12 | C5 | C5 | C5 | C5 | * | * | * | C5 | * | * | * | * | * | * |
| | | ANOD | DFL | ETF13 | C2 | C2 | C1 | C1 | C3 | C4 | C1 | C1 | C3 | C4 | C1 | C1 | C1 | C1 |
| | | | | ETF14 | C2 | C2 | C1 | C1 | C3 | C4 | C1 | C1 | C3 | C4 | C1 | C1 | C1 | C1 |
| | | | | ETF15 | C2 | C2 | C1 | C1 | C3 | C4 | C1 | * | C3 | C4 | C1 | C1 | C1 | C1 |
| | | | | ETF16 | C5 | C5 | C5 | C5 | * | * | * | C5 | * | * | * | * | C5 | * |
| | | | W | ETF17 | C2 | C2 | C1 | C1 | C3 | C4 | C1 | * | C3 | C4 | C1 | C1 | C1 | C1 |
| | | | | ETF18 | C2 | C2 | C1 | C1 | C3 | C4 | C1 | * | C3 | C4 | C1 | C1 | C1 | C1 |
| | | | | ETF19 | C2 | C2 | C1 | C1 | C3 | C4 | C1 | * | C3 | C4 | C1 | C1 | C1 | C1 |
| | | | | ETF20 | C3 | C3 | C3 | C3 | C3 | C3 | C3 | C3 | C3 | C3 | C3 | C3 | C3 | C3 |
| | | | | ETF21 | C3 | C3 | C3 | C3 | C3 | C3 | C3 | C3 | C3 | C3 | C3 | C3 | C3 | C3 |

| Brazilian Green Coffee Exports by Country of Destination | | | | |
|---|---|---|---|---|
| (NCM 0901.11.10, MT,US$ 000 FOB) | | | | |
| | MY 2013/14 1/ | | MY 2013/14 2/ | |
| Country | Quantity | Value | Quantity | Value |
| Germany | 370,977 | 962,293 | 270,353 | 634,622 |
| United States | 371,998 | 950,771 | 263,643 | 627,671 |
| Belgium | 135,278 | 370,064 | 98,867 | 255,041 |
| Italy | 163,766 | 448,572 | 123,677 | 313,397 |
| Japan | 130,078 | 386,993 | 99,514 | 282,583 |

FIG. 2B

| Dia. Code | Dia. [mm] | STEEL 1100MPa<R<1300MPa/CRES R<1100MPa/Titanium R<1100MPa | | | | | | | | | | | | STEEL <860MPa | | |
|---|---|---|---|---|---|---|---|---|---|---|---|---|---|---|---|---|
| | | C1 | | | C2 | | | C3 | | | C4 | | | C5 | | |
| | | Min | Nom | Max | Min | Nom | Max | Min | Nom | Max | Min | Nom | Max | Min | Nom | Max |
| 06 | 3,5 | 1,3 | 1,5 | n/a | n/a | n/a | n/a | n/a | n/a | n/a | n/a | n/a | n/a | 1,3 | 1,5 | 1,7 |
| 08 | 4,16 | 2,2 | 2,5 | 2,8 | 2,8 | 3,2 | 3,7 | 1,3 | 1,5 | 1,7 | n/a | n/a | n/a | 2,2 | 2,5 | 2,8 |
| 3 | 4,82 | 3,7 a) | 4,2 a) | 4,8 a) | | | | | | | 2,8 | 3,2 | 3,7 | 3,7 | 4,2 | 4,8 |
| 3A | 5,6 | | | | | | | | | | | | | n/a | n/a | n/a |

Torque Values min/nom/max [NM] for pins made from

FIG. 3

| column 1 | column 2 | column 3 | column 4 | column 5 | column 6 | column 7 | column 8 | column 9 |
|---|---|---|---|---|---|---|---|---|
| 06 | 3,5 | Torq... | STEE... | C1 | Min | 1,3 | 1,5 | 1,7 |
| 06 | 3,5 | Torq... | STEE... | C2 | Min | n/a | n/a | n/a |
| 06 | 3,5 | Torq... | STEE... | C3 | Min | n/a | n/a | n/a |
| 06 | 3,5 | Torq... | STEE... | C4 | Min | 1,3 | 1,5 | 1,7 |
| 06 | 3,5 | Torq... | STEE... | C5 | Min | 2,2 | 2,5 | 2,8 |
| 08 | 4,16 | ... | ... | C1 | ... | ... | ... | ... |
| ... | ... | | | | | | | |

FIG. 4

{ table_caption :" Torque values ",
  projection : [ "Max" ],
  conditions : [ { attribute_name :" Dia. Code ", value :"3A" },
              { value :" C2 "} ] }

FIG. 7

```
SELECT ? row ? proj_val_1 WHERE {
    ?row rdf: type :Row .
    ? table : hasRow ?row .
    OPTIONAL { ? table : hasCaption ? cap_1 .
               ? cap_1 search " Torque values " }
    ...
    OPTIONAL { ? table : hasAttribute ? proj_1 .
               ? proj_1 search "Max" .
               ?row ? proj_1 ? proj_val_1 }
    ...
    OPTIONAL { ?row ? attr_1 ? val_1 .
               ? attr_1 search "Dia. Code " .
               ? val_1 search "3A" }
    OPTIONAL { ?row ? attr_2 ? val_2 .
               ? val_2 search "C2" }
}
```

FIG. 8

Algorithm 1: *QueryMultiTable*

Input: *goal_labels, input_values*

1    *results*= *QuerySingleTable*(_, *input_values*);
2    if *results* ≠ *null* then
3        return *results*
4    else *results* == *null*
5        *tables*=Search all the tables containing goals labels;
6        Reorder *tables* following the number of known elements in the table;
7        for *table* in *tables* do [following the new order]
8            *keys* = Find the primary keys for *table*;
9            for *key* in *keys* do
10                *key_components* = Retrieve *key* components;
11                *known_components*= Identify the known elements of the key;
12                *unknown_components*= (*key_components*) \ (*known_components*);
13                instantiate *retrieved_values*;
14                for *unknown_component* in *unknown_components* do
15                    *retrieved_values*+=
                         RetrieveValues(*table*, *unknown_component*, (*input_values* \ *known_components*)) [see Algorithm 2];
16                *results*+=*QuerySingleTable*(*table*, (*input_values*, *retrieved_values*));
17    return *results*;

FIG. 9

Algorithm 2: *RetrieveValues*

Input: *table, unknown_component, values*

1. *retrieved_values*=null;
2. *inclusion_dep*=Find all the inclusion dependencies for the *unknown_component*;
3. for *(dependency_table,dependency_column)* in *inclusion_dep* do
4.     *result_row* = *QuerySingleTable(dependency_table, column, values)* = rows with the remaining not used input data;
5.     *retrieved_value*=projection of *result_row* on *dependency_column*;
6.     *retrieved_values*+ = *retrieved_value*;
7. return *retrieved_values*;

FIG.10

```
{                          {                        { targets : [
   conditions : [              conditions : [           "min "," nom "," max" ],
   { value :" ITF14 "},        { value :" 8  "  },      conditions : [
   { value :" ITF2 " }         { value :" C2 " }        { value : "8"      },
   ]                           ]                        { value :" ITF14 "},
}                          }                            { value :" ITF2 " }
                                                     ] }
```

FIG. 11

| Number of row headers | Number of column headers | Follows 5 by 5 rule | Repeated 3 column headers | 2 left most empty columns | Complex com- bination | caption contains tightening speed limitation | header contains incremental numbers | header contains spanning header after two columns | Label |
|---|---|---|---|---|---|---|---|---|---|
| 0 | 2 | 0 | 0 | 0 | 0 | 1 | 1 | 1 | complex_2_row |
| 0 | 1 | 0 | 0 | 0 | 0 | 0 | 0 | 0 | standard_1_row |
| 5 | 5 | 1 | 0 | 1 | 0 | 0 | 0 | 0 | complex_5_by_5 |
| 5 | 5 | 1 | 0 | 1 | 0 | 0 | 0 | 0 | complex_5_by_5 |
| 0 | 1 | 0 | 1 | 1 | 0 | 0 | 0 | 0 | complex_3_column_grouped |
| 5 | 5 | 1 | 0 | 1 | 0 | 0 | 0 | 0 | complex_5_by_5 |
| 0 | 5 | 0 | 1 | 1 | 0 | 0 | 0 | 1 | complex_3_column_grouped |
| 0 | 5 | 0 | 1 | 1 | 0 | 0 | 0 | 1 | complex_3_column_grouped |
| 0 | 5 | 0 | 1 | 1 | 0 | 0 | 0 | 1 | complex_3_column_grouped |
| 0 | 5 | 0 | 1 | 1 | 0 | 0 | 0 | 1 | complex_3_column_grouped |
| 5 | 5 | 1 | 0 | 1 | 0 | 0 | 0 | 0 | complex_5_by_5 |
| 5 | 5 | 1 | 0 | 1 | 0 | 0 | 0 | 0 | complex_5_by_5 |
| 0 | 5 | 0 | 1 | 1 | 0 | 0 | 0 | 1 | complex_3_column-grouped |
| 0 | 2 | 0 | 0 | 0 | 1 | 0 | 0 | 0 | complex_combination |
| 0 | 4 | 0 | 1 | 1 | 0 | 0 | 0 | 1 | complex_3_column_grouped |
| 5 | 5 | 1 | 0 | 1 | 0 | 0 | 0 | 0 | complex_5_by_5 |
| 0 | 5 | 0 | 1 | 1 | 0 | 0 | 0 | 1 | complex_3_column_grouped |
| 0 | 2 | 0 | 0 | 0 | 1 | 0 | 0 | 0 | complex_combination |
| 0 | 3 | 0 | 1 | 1 | 0 | 0 | 0 | 1 | complex_3_column_grouped |
| 0 | 1 | 0 | 0 | 0 | 0 | 0 | 0 | 0 | standard_1_row |
| 0 | 0 | 0 | 0 | 0 | 0 | 0 | 0 | 0 | standard_0_row |

• Number of row headers: using the masking approach we identify the number of row headers for the given tables.

• Number of column headers: using the masking approach we identify the number of column headers for the given tables.

• Follows 5 by 5 rule: complex_5_by_5 table type has a distinct feature which is the number of empty matrix on the upper left hand side of the tables. This feature helps humans to identify complex_5_by_5 table type

• Repeated 3 column headers: complex_3_column_grouped table type has repeated 3 values in the column header which helps humans to recognize the table type.

• 2 leftmost empty columns: complex_3_column_grouped table type also has two empty columns in the header part.

• Complex_combination: complex_5_by_5 table type is sometimes provided in a different format called Complex_combination. The first column header always contain string "combination"

• Caption contains tightening speed limitation: We make use of the caption of the tables to recognize complex_2_row table type

• Header contains incremental numbers: complex_2_row and complex_3_row tables contain incremental numbers in the header part

• Header contains spanning header after two columns: complex_2_row and complex_3_column_grouped table always contain a spanning column header which is unique to these table types.

FIG. 14

| ↑AN | ↑ANDA | 1500↘ | | ↑NA | | | | ↑ANDND | | | ↑ANDND |
|---|---|---|---|---|---|---|---|---|---|---|---|
| Diameter Code No. | Thread UNJF-3A | T Max | T Min | Group No. | ØA Max | ØA' Max | H | W + 0.0050 | C Max | E Max | r + 0.250 |
| 3 | 0.1900-32 | 4.77 | 4.68 | 1 | 8.73 | 7.55 | 0.84 | 6,584 | 1.60 | 0.38 | 0.51 |
| | | | | 2 | 9.04 | 7.83 | 0.96 ± 0.05 | | | | |
| | | | | 3 | 9.29 | 8.08 | 1.06 | | | | |
| 4 | 0.2400-28 | 6.30 | 6.19 | 1 | 11.40 | 10.16 | 0.69 | 9,591 | 2.00 | | |
| | | | | 2 | 11.73 | 10.49 | 0.83 | | | | |
| | | | | 3 | 12.09 | 10.82 | 0.97 | | | | |
| | | | | 4 | 12.42 | 11.15 | 1.10 ± 0.06 | | | | |
| 5 | 0.3125-24 | 7.88 | 7.76 | 1 | 13.97 | 12.70 | 0.68 | 12,162 | 2.39 | | |
| | | | | 2 | 14.32 | 13.06 | 0.83 | | | | |
| | | | | 3 | 14.68 | 13.41 | 0.98 | | | | |
| 6 | 0.3750-24 | 9.47 | 9.34 | 1 | 16.68 | 15.37 | 0.84 | 14,468 | 2.84 | | 0.76 |
| | | | | 2 | 17.07 | 15.75 | 1.00 ± 0.07 | | | | |
| | | | | 3 | 17.45 | 16.13 | 1.16 | | | | |
| 7 | 0.4375-20 | 11.06 | 10.91 | 1 | 19.61 | 17.83 | 1.11 | 16,713 | 3.38 | | |
| | | | | 2 | 20.06 | 18.29 | 1.31 | | | | |
| | | | | 3 | 20.52 | 18.72 | 1.49 | | | | |
| 8 | 0.5000-20 | 12.65 | 12.50 | 1 | 21.94 | 20.12 | 1.42 ± 0.08 | 18,283 | 3.66 | 0.56 | 1.02 |
| | | | | 2 | 22.48 | 20.65 | 1.65 | | | | |
| | | | | 3 | 23.01 | 21.16 | 1.87 | | | | |
| | | | | 4 | 23.54 | 21.67 | 2.08 | | | | |
| 9 | 0.5625-18 | 14.23 | 14.07 | 1 | 24.84 | 22.91 | 0.83 | 22,606 | 4.11 | 0.61 | |
| | | | | 2 | 25.63 | 23.67 | 1.15 ± 0.09 | | | | |
| | | | | 3 | 26.41 | 24.44 | 1.48 | | | | |
| 10 | 0.250-18 | 15.82 | 15.66 | 1 | 27.68 | 25.60 | 0.82 | 25,465 | 4.60 | 0.66 | 1.52 |
| | | | | 2 | 28.55 | 26.44 | 1.17 ± 0.10 | | | | |
| | | | | 3 | 29.41 | 27.25 | 1.52 | | | | |
| ↓D | ↓DNDND | ↓DND | | | | | | ↓NDND | | | |

FIG. 15

| Diameter Code No. | Thread UNJF-3A as per AS-8879 | ⌀ A Max | ⌀ B Max | ⌀ D | H Max. | E Max. | T Ref. | W | X | r | Recess Number | Y | Z | Mass (g) | |
|---|---|---|---|---|---|---|---|---|---|---|---|---|---|---|---|
| | | | | | | | | | | | | | | Head and Thread | Smooth Part |
| 3 | 0.1900-32 | 9,677 | 8,53 | 4,813 4,788 | 2,08 | 0,38 | 8,20 | 0,533 ±0,033 | 8,306 | 0,508 0,254 | 2 | 0,114 | 0,101 | 0,84 | 0,11 |
| 3A | | 9,677 | 8,53 | 4,813 4,788 | 2,08 | 0,38 | 10,20 | 0,533 ±0,033 | 8,306 | 0,508 0,254 | 2 | 0,114 | 0,101 | 1,01 | 0,11 |
| 4 | 0.2500-28 | 12,903 | 11,58 | 6,337 6,312 | 2,82 | 0,46 | 9,40 11,40 | 0,759 ±0,038 | 10,968 | 0,502 0,254 | 3 | 0,114 | 0,076 | 1,75 | 0,18 |
| 4A | | | | | | | | | | | | | | | | |

1600

| ANAN | ANDAND | NAN | NA | NA | AN | AN | AN | A | A | ANDND | A | A | A | ANAN | NA |
|---|---|---|---|---|---|---|---|---|---|---|---|---|---|---|---|
| A | A | A | A | A | A | A | A | A | A | A | A | A | A | A | A |
| D | NDND | DND | DND | DND | DND | DND | DND | DNDND | DND | DND | D | DND | DND | DND | DND |
| DA | NDND | DND | DND | DND | DND | DND | DND | DNDNDND | DNDDND | DND | D | DND | DND | DND | DND |
| D | NDND | DND | DND | DND | DND | DND | DND | DNDNDND | DNDDND | DND | D | DND | DND | DND | DND |
| DA | NDND | DND | DND | DND | DND | DND | DND | DNDNDND | DNDDND | DND | D | DND | DND | DND | DND |

1602

| ANAN | ANDAND | NAN | NA | NA | AN | AN | AN | A | A | ANDND | A | A | A | ANAN | NA |
|---|---|---|---|---|---|---|---|---|---|---|---|---|---|---|---|
| A | A | A | A | A | A | A | A | A | A | A | A | A | A | A | A |
| D | NDND | DND | DND | DND | DND | DND | DND | DNDND | DND | DND | D | DND | DND | DND | DND |
| DA | NDND | DND | DND | DND | DND | DND | DND | DNDNDND | DNDDND | DND | D | DND | DND | DND | DND |
| D | NDND | DND | DND | DND | DND | DND | DND | DNDNDND | DNDDND | DND | D | DND | DND | DND | DND |
| DA | NDND | DND | DND | DND | DND | DND | DND | DNDNDND | DNDDND | DND | D | DND | DND | DND | DND |

Table 1702:

| ANAN | ANDAND | NAN | NA | NA | AN | AN | AN | ANDND | A | A | A | A | ANAN | ANAN |
|---|---|---|---|---|---|---|---|---|---|---|---|---|---|---|
| A | A | A | A | A | A | A | A | A | A | A | A | A | A | A |
| D | NDND | DND | DND | DND | DND | DND | DND | DNDDND | DND | DND | DND | DND | DND | DND |
| DA | NDND | DND | DND | DND | DND | DND | DND | DNDDND | DND | DND | DND | DND | DND | DND |
| D | NDND | DND | DND | DND | DND | DND | DND | DNDDND | D | DND | DND | DND | DND | DND |
| DA | NDND | DND | DND | DND | DND | DND | DND | DNDDND | D | DND | DND | DND | DND | DND |

Table 1704 (with bracket 1706 grouping first two columns):

| Number of row headers | Number of column headers | Follows 5 by 5 rule | Repeated 3 column headers | 2 left most empty columns | Complex _com-bination | caption contains tightening speed limitaion | header contains incremental numbers | header contains spanning header after two columns | Label |
|---|---|---|---|---|---|---|---|---|---|
| 0 | 2 | 0 | 0 | 0 | 0 | 1 | 1 | 1 | complex_2_row |
| 0 | 1 | 0 | 0 | 0 | 0 | 0 | 0 | 0 | standard_1_row |
| 5 | 5 | 1 | 0 | 1 | 0 | 0 | 0 | 0 | complex_5_by_5 |
| 5 | 5 | 1 | 0 | 1 | 0 | 0 | 0 | 0 | complex_5_by_5 |
| 0 | 1 | 0 | 1 | 1 | 0 | 0 | 0 | 0 | complex_3_column_grouped |
| 5 | 5 | 1 | 0 | 1 | 0 | 0 | 0 | 1 | complex_5_by_5 |
| 0 | 5 | 0 | 1 | 1 | 0 | 0 | 0 | 1 | complex_3_column_grouped |
| 0 | 5 | 0 | 1 | 1 | 0 | 0 | 0 | 1 | complex_3_column_grouped |
| 0 | 5 | 0 | 1 | 1 | 0 | 0 | 0 | 0 | complex_3_column_grouped |
| 5 | 5 | 1 | 0 | 1 | 0 | 0 | 0 | 0 | complex_5_by_5 |
| 5 | 5 | 1 | 1 | 1 | 0 | 0 | 0 | 1 | complex_5_by_5 |
| 0 | 2 | 0 | 0 | 0 | 1 | 0 | 0 | 0 | complex_combination |
| 0 | 4 | 1 | 1 | 1 | 0 | 0 | 0 | 1 | complex_3_column_grouped |
| 5 | 5 | 0 | 0 | 0 | 0 | 0 | 0 | 1 | complex_5_by_5 |
| 0 | 5 | 0 | 1 | 1 | 0 | 0 | 0 | 1 | complex_3_column_grouped |
| 0 | 2 | 0 | 0 | 0 | 1 | 0 | 0 | 0 | complex_combination |
| 0 | 3 | 0 | 1 | 1 | 0 | 0 | 0 | 1 | complex_3_column_grouped |
| 0 | 1 | 0 | 0 | 0 | 0 | 0 | 0 | 0 | standard_1_row |
| 0 | 0 | 0 | 0 | 0 | 0 | 0 | 0 | 0 | standard_0_row |

| | | Torque Values min/nom/max [NM] for pins made from | | | | | | | | | | | | | |
|---|---|---|---|---|---|---|---|---|---|---|---|---|---|---|---|
| | | STEEL 1100MPa<R<1300MPa/CRES R<1100MPa/Titanium R<1100MPa | | | | | | | | | | | STEEL <860MPa | | |
| | | C1 | | | C2 | | | C3 | | | C4 | | | C5 | |
| Dia. Code | Dia. [mm] | Min | Nom | Max | Min | Nom | Max | Min | Nom | Max | Min | Nom | Max | Min | Nom | Max |
| 06 | 3,5 | 1,3 | 1,5 | 1,7 | n/a | n/a | n/a | n/a | n/a | n/a | n/a | n/a | n/a | 1,3 | 1,5 | 1,7 |
| 08 | 4,16 | 2,2 | 2,5 | 2,8 | n/a | n/a | n/a | n/a | n/a | n/a | n/a | n/a | n/a | 2,2 | 2,5 | 2,8 |
| 3 | 4,82 | 3,7a) | 4,2a) | 4,8a) | 2,8 | 3,2 | 3,7 | 1,3 | 1,5 | 1,7 | 2,8 | 3,2 | 3,7 | 3,7 | 4,2 | 4,8 |
| 3A | 5,6 | | | | | | | | | | | | | n/a | n/a | n/a |
| 4 | 6,35 | 8,2 | 9,4 | 10,6 | 6,3 | 7,2 | 8,2 | 2,8 | 3,2 | 3,7 | 6,3 | 7,3 | 8,2 | 8,2 | 9,4 | 10,6 |
| 5 | 7,92 | 13,8 | 15,8 | 17,9 | 10,6 | 12,2 | 13,8 | 6,3 | 7,2 | 8,2 | 13,8 | 15,8 | 17,9 | n/a | n/a | n/a |
| 6 | 9,52 | 26,9 | 29,5 | 32,2 | 17,9 | 20,1 | 22,4 | 10,6 | 12,2 | 13,8 | 17,9 | 20,1 | 22,4 | n/a | n/a | n/a |
| 7 | 11,1 | 38,7 | 42,5 | 46,4 | 22,4 | 24,6 | 26,9 | 13,8 | 15,8 | 17,9 | 26,9 | 29,5 | 32,2 | n/a | n/a | n/a |
| 8 | 12,7 | 55,7 | 61,3 | 66,9 | 32,2 | 35,4 | 38,7 | 17,9 | 20,1 | 22,4 | 38,7 | 42,5 | 46,4 | n/a | n/a | n/a |
| 9 | 14,3 | 66,9 | 73,5 | 80,2 | 38,7 | 42,5 | 46,4 | 32,2 | 36,5 | 38,7 | 55,7 | 61,3 | 66,9 | n/a | n/a | n/a |
| 10 | 15,9 | 96,3 | 105,6 | 115,0 | 46,4 | 51,0 | 55,7 | 46,4 | 52,6 | 55,7 | 66,9 | 73,5 | 80,2 | n/a | n/a | n/a |
| 12 | 19,05 | 138,7 | 152,5 | 166,4 | 80,2 | 88,2 | 96,3 | 66,9 | 75,8 | 80,2 | 96,3 | 105,6 | 115,0 | n/a | n/a | n/a |
| 14 | 22,2 | n/a | n/a | n/a | n/a | n/a | n/a | n/a | n/a | n/a | 135,7 | 148,5 | 161,5 | n/a | n/a | n/a |
| 16 | 25,4 | n/a | n/a | n/a | n/a | n/a | n/a | n/a | n/a | n/a | 180,5 | 197,4 | 214,5 | n/a | n/a | n/a |
| 18 | 28,6 | n/a | n/a | n/a | n/a | n/a | n/a | n/a | n/a | n/a | 231,7 | 253,2 | 274,9 | n/a | n/a | n/a |

FIG. 19

| HEADER 0 | HEADER 1 | HEADER 2 | HEADER 3 | HEADER 4 | HEADER 5 | HEADER 6 | HEADER 7 | HEADER 8 |
|---|---|---|---|---|---|---|---|---|
| 06 | 3.5 | TORQUE VALUES MIN/NOM/MAX [Nm] FOR PINS MADE FROM | STEEL 110MPa | C1 | Min | 1.3 | 1.5 | 1.7 |
| 06 | 3.5 | TORQUE VALUES MIN/NOM/MAX [Nm] FOR PINS MADE FROM | STEEL 110MPa | C2 | Min | n/a | n/a | n/a |
| 06 | 3.5 | TORQUE VALUES MIN/NOM/MAX [Nm] FOR PINS MADE FROM | STEEL 110MPa | C3 | Min | n/a | n/a | n/a |
| 06 | 3.5 | TORQUE VALUES MIN/NOM/MAX [Nm] FOR PINS MADE FROM | STEEL 110MPa | C4 | Min | n/a | n/a | n/a |
| 06 | 3.5 | TORQUE VALUES MIN/NOM/MAX [Nm] FOR PINS MADE FROM | STEEL <860MPa | C5 | Min | 1.3 | 1.5 | 1.7 |
| 08 | 4.16 | TORQUE VALUES MIN/NOM/MAX [Nm] FOR PINS MADE FROM | STEEL 110MPa | C1 | Min | 2.2 | 2.5 | 2.8 |
| 08 | 4.16 | TORQUE VALUES MIN/NOM/MAX [Nm] FOR PINS MADE FROM | STEEL 110MPa | C2 | Min | n/a | n/a | n/a |
| 08 | 4.16 | TORQUE VALUES MIN/NOM/MAX [Nm] FOR PINS MADE FROM | STEEL 110MPa | C3 | Min | n/a | n/a | n/a |

FIG. 20

| External threaded fastener | | | | | | | | | | | | | | | | | | | | |
|---|---|---|---|---|---|---|---|---|---|---|---|---|---|---|---|---|---|---|---|---|
| Material | TI | | | | | | | | | | | | | | | | | | | |
| Finish | IVD | | | | | | | | | | RBC | | | | | | | | | |
| Lubrication | CA | | | | | | | | | | W | | | | | | | | | |

| | | | Internal threaded fastener | | | | | | | | | | | | |
|---|---|---|---|---|---|---|---|---|---|---|---|---|---|---|---|
| | | | Material | CRES | | | | | | | | | | | |
| | | | Finish | PASS | | | | | | | CAD | SIL | | | |
| | | | Lubrication | W | CA | | DFL | | CA | | CA | W | | SIL | DFL |
| Material | Finish | Lubrication | | NAS509(L)C / NAS1423C(LH) | NAS1726CP | NAS1726CPE | NAS1727CE/KE | NAS5059E | NAS5060E | NAS1726CE | NAS5050C / NAS1726CSE | NAS5059C | NAS5060C | ASNA2021CE / NAS1726CSE | NAS1291CM |
| TI | IVD | CA | NAS1102VA | C2 | C1 | | | C3 | C4 | C1 | * | C3 | C4 | C1 | |
| | | | NAS1113VA- | | | | | | | | | | | | |
| | | | NAS1151VA- | | | | | | | | | | | | |
| | | | NAS1581KG | | | | | | | | | | | | |
| | | | NAS1790VA | | | | | | | | | | | | |
| | | | DAN169K | | | | | | | | | | | | |
| | | | ABS0114V | C2 | | C1 | C3 | C3 | C4 | C1 | * | C3 | C4 | C1 | C1 |
| | | | ABS0260V | | | | | | * | | * | | * | | C1 |
| | | | ABS0950V | | | | | | | | | | | | |
| | | | ASNA2001V | C2 | | C1 | | C3 | C4 | C1 | * | C3 | C4 | C1 | |
| | | | NSA5089V | | | | | | | | | | | | |

2104

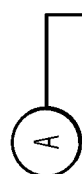

| ROWS IN TABLE | | | | | | | | |
|---|---|---|---|---|---|---|---|---|
| COPY \| CSV \| EXCEL \| PDF | | | | | SEARCH: | | | |
| HEADER 0 | HEADER 1 | HEADER 2 | HEADER 3 | HEADER 4 | HEADER 5 | HEADER 6 | HEADER 7 | HEADER 8 |
| 06 | 3.5 | TORQUE VALUES MIN/NOM/MAX [Nm] FOR PINS MADE FROM | STEEL 110MPa | C1 | Min | 1.3 | 1.5 | 1.7 |
| 06 | 3.5 | TORQUE VALUES MIN/NOM/MAX [Nm] FOR PINS MADE FROM | STEEL 110MPa | C2 | Min | n/a | n/a | n/a |
| 06 | 3.5 | TORQUE VALUES MIN/NOM/MAX [Nm] FOR PINS MADE FROM | STEEL 110MPa | C3 | Min | n/a | n/a | n/a |
| 06 | 3.5 | TORQUE VALUES MIN/NOM/MAX [Nm] FOR PINS MADE FROM | STEEL 110MPa | C4 | Min | n/a | n/a | n/a |
| 06 | 3.5 | TORQUE VALUES MIN/NOM/MAX [Nm] FOR PINS MADE FROM | STEEL 110MPa | C5 | Min | 1.3 | 1.5 | 1.7 |
| 08 | 4.16 | TORQUE VALUES MIN/NOM/MAX [Nm] FOR PINS MADE FROM | STEEL 110MPa | C1 | Min | 2.2 | 2.5 | 2.8 |
| 08 | 4.16 | TORQUE VALUES MIN/NOM/MAX [Nm] FOR PINS MADE FROM | STEEL 110MPa | C2 | Min | n/a | n/a | n/a |
| 08 | 4.16 | TORQUE VALUES MIN/NOM/MAX [Nm] FOR PINS MADE FROM | STEEL 110MPa | C3 | Min | n/a | n/a | n/a |

| HEADER 0 | HEADER 1 | HEADER 2 | HEADER 3 | HEADER 4 | HEADER 5 | HEADER 6 | HEADER 7 | HEADER 8 | HEADER 9 | HEADER 10 |
|---|---|---|---|---|---|---|---|---|---|---|
| External threaded fastener | TI | ANOD | CA | ABS0114T | Internal threaded fastener | CRES | PASS | W | NAS1726CP | C1 |
| External threaded fastener | TI | ANOD | CA | ABS0114T | Internal threaded fastener | CRES | PASS | CA | NAS1726CPE | C1 |
| External threaded fastener | TI | ANOD | CA | ABS0114T | Internal threaded fastener | CRES | PASS | CA | NAS1727CE/KI | C1 |
| External threaded fastener | TI | ANOD | CA | ABS0114T | Internal threaded fastener | CRES | CAD | CA | NAS1726CE | C1 |
| External threaded fastener | TI | ANOD | CA | ABS0114T | Internal threaded fastener | CRES | SIL | W | NSA5060C NAS1726CSE | C1 |

FIG. 22B

| Dia. Code | Dia. [mm] | Torque Values min/nom/max [NM] for pins made from | | | | | | | | | | | | | | |
|---|---|---|---|---|---|---|---|---|---|---|---|---|---|---|---|---|
| | | STEEL 1100MPa<R<1300MPa/CRES R<1100MPa/Titanium R<1100MPa | | | | | | | | | | | | STEEL <860MPa | | |
| | | C1 | | | C2 2310 | | | C3 | | | C4 | | | C5 | | |
| | | Min | Nom | Max | Min | Nom | Max | Min | Nom | Max | Min | Nom | Max | Min | Nom | Max |
| 06 | 3,5 | 1,3 | 1,5 | 1,7 | n/a | n/a | n/a | n/a | n/a | n/a | n/a | n/a | n/a | 1,3 | 1,5 | 1,7 |
| 08 | 4,16 | 2,2 | 2,5 | 2,8 | n/a | n/a | n/a | n/a | n/a | n/a | n/a | n/a | n/a | 2,2 | 2,5 | 2,8 |
| 3 | 4,82 | 3,7 a) | 4,2 a) | 4,8 a) | 2,8 | 3,2 | 3,7 | 1,3 | 1,5 2314 | 1,7 | 2,8 | 3,2 | 3,7 | 3,7 | 4,2 | 4,8 |
| 3A | 5,6 | 8,2 | 9,4 | 10,6 | 6,3 | 7,2 | 8,2 | 2,8 | 3,2 | 3,7 | 6,3 | 7,3 | 8,2 | n/a | n/a | n/a |
| 4 | 6,35 | 8,2 | 9,4 | 10,6 | 6,3 | 7,2 | 8,2 | 2,8 | 3,2 | 3,7 | 6,3 | 7,3 | 8,2 | 8,2 | 9,4 | 10,6 |
| 5 | 7,92 | 13,8 | 15,8 | 17,9 | 10,6 | 12,2 | 13,8 | 6,3 | 7,2 | 8,2 | 13,8 | 15,8 | 17,9 | n/a | n/a | n/a |
| 6 | 9,52 | 26,9 | 29,5 | 32,2 | 17,9 | 20,1 | 22,4 | 10,6 | 12,2 | 13,8 | 17,9 | 20,1 | 22,4 | n/a | n/a | n/a |
| 7 | 11,1 | 38,7 | 42,5 | 46,4 | 22,4 | 24,6 | 26,9 | 13,8 | 15,8 | 17,9 | 26,9 | 29,5 | 32,2 | n/a | n/a | n/a |
| 8 | 12,7 | 55,7 | 61,3 | 66,9 | 32,2 | 35,4 | 38,7 | 17,9 | 20,1 | 22,4 | 38,7 | 42,5 | 46,4 | n/a | n/a | n/a |
| 9 | 14,3 | 66,9 | 73,5 | 80,2 | 38,7 | 42,5 | 46,4 | 32,2 | 36,5 | 38,7 | 55,7 | 61,3 | 66,9 | n/a | n/a | n/a |
| 10 | 15,9 | 96,3 | 105,6 | 115,0 | 46,4 | 51,0 | 55,7 | 46,4 | 52,6 | 55,7 | 66,9 | 73,5 | 80,2 | n/a | n/a | n/a |
| 12 | 19,05 | 138,7 | 152,5 | 166,4 | 80,2 | 88,2 | 96,3 | 66,9 | 75,8 | 80,2 | 96,3 | 105,6 | 115,0 | n/a | n/a | n/a |
| 14 | 22,2 | n/a | n/a | n/a | n/a | n/a | n/a | n/a | n/a | n/a | 135,7 | 148,5 | 161,5 | n/a | n/a | n/a |
| 16 | 25,4 | n/a | n/a | n/a | n/a | n/a | n/a | n/a | n/a | n/a | 180,5 | 197,4 | 214,5 | n/a | n/a | n/a |
| 18 | 28,6 | n/a | n/a | n/a | n/a | n/a | n/a | n/a | n/a | n/a | 231,7 | 253,2 | 274,9 | n/a | n/a | n/a |

FIG. 23A

AUTOMATIC TRANSFORMATION OF COMPLEX TABLES IN DOCUMENTS INTO COMPUTER UNDERSTANDABLE STRUCTURED FORMAT AND MANAGING DEPENDENCIES

BACKGROUND

The present disclosure generally relates to table data extraction technology, and more particularly relates to a system and method for complex table transformation in support of table queries over transformed tables.

Complex tables are found in many types of electronic documents, such as in PDF documents, Word documents, or HTML documents. It is often not clear, for computer systems, how to distinguish what type of data is in each cell of a complex table. Table data values can be confused with attribute names, table headers, and other table meta-data, which are often found in cells of complex tables. The table layouts are generally not designed for searching queries over the table data. Typically the table layouts are designed to save space in a document that includes the tables. To extract data values from a large number of tables in a corpus of electronic documents, and to attempt to map relationships between the data values and between tables, can be a highly manual data integration process. Results of such manual efforts, for other than processing very simple single table formats, have been often error prone and generally unsuccessful.

BRIEF SUMMARY

According to one aspect of the present disclosure, provided is a computer-implemented method for maintaining dependency information among a plurality of database tables, the method comprising: determining a plurality of dependent objects, wherein a dependent object comprises all or part of a database table comprising the plurality of database tables; determining a frequency of access for each of the plurality of dependent objects; and in response to an access frequency of a dependent object exceeding a threshold, maintaining dependency information corresponding to the object.

According to another aspect of the present disclosure, provided is a computer-implemented method for determining frequencies for updating dependency information among a plurality of database tables, the method comprising: determining a plurality of dependent objects, wherein a dependent object comprises all or part of a database table comprising the plurality of database tables; determining a frequency of access for each of the plurality of dependent objects; and using the frequency of access for each of the plurality of dependent objects to determine a frequency of updating dependency information for each of the plurality of dependent objects.

According to another aspect of the present disclosure, a computer readable storage medium comprises computer instructions which, responsive to being executed by a processor, cause the processor to perform a method comprising: determining a plurality of dependent objects, wherein a dependent object comprises all or part of a database table comprising the plurality of database tables; determining a frequency of access for each of the plurality of dependent objects; and in response to an access frequency of a dependent object exceeding a threshold, maintaining dependency information corresponding to the object.

BRIEF DESCRIPTION OF THE SEVERAL VIEWS OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIGS. 2A and 2B are two examples of compact tables;

FIG. 3 is an example of a table expansion method according to various embodiments of the invention;

FIG. 4 is an example of an expanded table related to the table shown in FIG. 3;

FIG. 7 is an example of query language suitable for use with various embodiment of the invention;

FIG. 8 is a translation of the example query language of FIG. 7;

FIG. 9 is an example first algorithm for querying one or more tables;

FIG. 10 an example second algorithm for querying one or more tables;

FIG. 11 is a set of examples of single and multi-table queries;

FIG. 13 is an example of a feature vector table;

FIG. 14 is an example list of decision rules for a table classifier;

FIG. 15 is an example of masks applied to table cell values;

FIG. 16 is an example of using masking applied to cells of a table to identify patterns and to find table header and table data locations in the table;

FIG. 17 is an example of a feature extraction and table classification method;

FIGS. 19 and 20 are an example of a table illustrating key dependency;

FIGS. 21A and 21B are an example of two tables illustrating multi-table foreign dependency;

FIGS. 22A and 22B are an example of two flattened tables corresponding to the two tables shown in FIGS. 21A and 21B, and illustrating multi-table foreign dependency;

FIGS. 23A and 23B are an example of two tables illustrating queries with multi-table inclusion dependencies;

DETAILED DESCRIPTION

Figure 1:
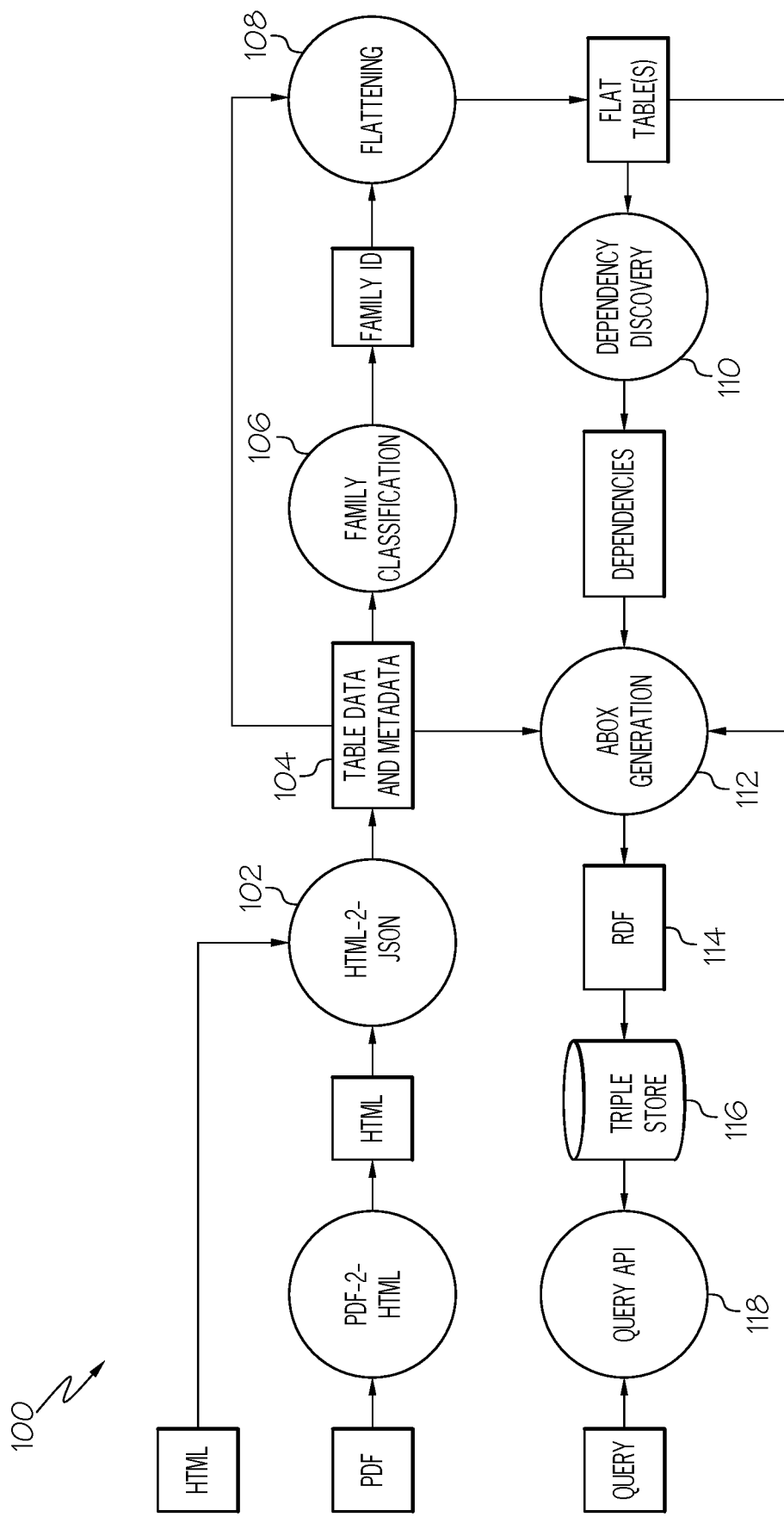
FIG. 1 is a block diagram illustrating an example of an operating environment for an information processing system, according to various embodiments of the present disclosure.

According to various embodiments of the present disclosure, disclosed is information processing systems and computer-based methods to automatically convert table data from compact tables to schema-less searchable table data, as will be discussed in detail below.

1.0—Introduction

Unstructured enterprise data such as reports, manuals and guidelines often contain tables. The traditional way of integrating data from these tables is through a two-step process of table detection/extraction and mapping the table layouts to an appropriate schema. This can be an expensive process. In this disclosure the inventors show that by using semantic technologies (e.g., RDF/SPARQL and database dependencies) paired with a simple but powerful way to transform tables with non-relational layouts, it is possible to offer query answering services over these tables with minimal manual work or domain-specific mappings. The inventive methods, according to various embodiments, enable users to exploit data in tables embedded in documents with little effort, not only for simple retrieval queries, but also for structured queries that require joining multiple interrelated tables.

Enterprise data includes large volumes of unstructured documents in the form of reports, manuals, guidelines, etc. Tables are of major importance within these documents. Often, these tables contain reference data that are required by enterprise personnel (e.g., help-desk operators, technicians in assembly lines, etc.) and difficult to access and query given that they are buried within documents.

The traditional way of extracting data from these tables was through table extraction and manual mapping, that is, system components were dedicated to detect the presence of tables in electronic documents, extract the tables from the electronic documents in a structured format, and use manual methods for mapping tables and table data content into global schemas. While there has been some limited success in domain-specific methods to create these mappings in several areas, general techniques are not available. Today, it is common that people interested in data within tables have to resort to manual mapping techniques, an expensive and intractable process.

In this disclosure the inventors take a different approach to the problem of accessing data in these tables. By using semantic technologies (e.g., RDF/SPARQL and database dependencies) paired with simple but powerful ways to transform tables with non-relational layouts, the inventors have demonstrated that it is possible to do query answering over these tables with minimal manual work, domain adaptation/mapping, or even with less than full knowledge of the arrangement of the tables by the user formulating the query. Some aspects of the inventive methods include the following: (a) A novel table classification based method to transform tables with complex layouts into "flat" layouts that are closer to a relational form (e.g., SQL-like) and allow the use of relational theory to discover structural meta-data about the tables (e.g. keys and inclusion dependencies) to enable complex query answering. (b) the methods can execute conjunctive queries on collections of tables with unknown schemas. In particular, an RDF graph implementing a universal schema can be used to store and index all rows for all tables and enable structured queries using search and features of SPARQL. (c) Use of relational dependencies to understand when a query requires JOIN-ing multiple tables and use of a query-rewriting style approach to execute such queries.

The inventive system and methods enable users to exploit data in tables with minimal effort, not only for simple retrieval queries, but also for complex structured queries. The methods described here have been tested and validated in the context of collaboration with a large industrial partner. The following disclosure is organized as follows: Section 2 introduces background definitions; Section 3 briefly summarizes various steps of an example of the inventive method; Section 4 describes various aspects of our novel approach to transform tables with non-relational layouts to relational-like layouts; Section 5 describes an example RDF schema that can be used to store data and meta-data for all tables in a corpus in a triple store; Section 6 introduces aspects of a novel query answering approach in accordance with various embodiments of the invention; Section 7 describes the application of these techniques in a project with an industrial partner; and finally, and Section 8 presents summary overview of an example information processing system, and examples of the inventive methods and techniques, presented herein, and which could be extended to support more complex queries or stronger semantic integration/understanding of tables according to various embodiments of the invention.

2.0—Preliminaries

Now we present a few definitions that we use throughout the paper, in particular, the notions of relations and dependencies.

Intuitively, a relation corresponds to a "flat table" or an SQL table, with a list of column names and rows (formally tuples). Each row in a relation holds the values for all the attributes of an object of interest, e.g., something concrete like a screw and its features (e.g., length, weight, identification code) or something abstract such as the time and place for an event. Formally, we define a relation R as an ordered list of attributes U. A tuple (i.e. row) over R is a mapping from each attribute $U_i \in U$ to a value. An instance of a relation R, is a set of tuples over U. The projection of a relation R over a subset of attributes U' is written as $\pi U'(R)$.

Intuitively, a dependency is a logical implication between columns of one or more relations (flat tables). Dependencies formally describe the ways in which data is arranged in relations. Dependencies are used for many purposes, one of the most common ones being consistency checking of tables in databases. The following two classes of dependencies are used in the novel method: functional dependencies and inclusion dependencies.

A functional dependency from a set of columns U' in a relation R to a second set of columns V' in a relation S, written as R: U'→S: V, means that for any set of unique values for U', there is a unique set of values for V', i.e., U functionally determines V'. We might omit writing R and S when they are unambiguous from the context. One of the most common forms of functional dependencies are keys; a key over a relation R is a functional dependency U'→U; the attributes in U'⊆U uniquely determines the rest of the attributes of R. For simplicity we may write Key(R, U'). When U' is a single attribute, we simply call it a key; when U' comprises 2 or more attributes, we call it a composite key.

Lastly, an inclusion dependency is an implication of the form R: U'⊆S: V', indicating that the values for attributes U' in relation R are a subset or equal to the values for the attributes V' over the relation S. Intuitively, this indicates that the attributes U' and V' share data and hence, are "joinable". A special case for inclusion dependencies are foreign keys, where V' is also a key for S.

3.0—Example System Overview

An example information processing system is illustrated in FIG. 1. The information processing system 100, according to the example, is deployed as two services, an ingestion service and a schema-less query API, which are both depicted in FIG. 1.

The information processing system 100, as shown in FIG. 1, includes an ingestion flow that starts by transforming PDF documents into HTML format and storing the HTML documents in a database. Any documents received in HTML format can be stored without conversion into the database. The PDF documents (and HTML documents) can include many different types of tables. A document conversion service that is commercially available from International Business Machines, Inc., can be used for this conversion of documents. From the HTML format documents, at step 102, the system 100 extracts the tables from the documents and generates a JSON representation in a JSON document database in which the system 100 may additionally do some minor normalization of the table data (e.g., remove spanning cells). A novel method is used to identify table cells that contain actual table data as distinguished from table cells that contain table meta-data such as table header information. According to various embodiments, the features of the tables, such as the number of row and column headers, are extracted from tables, at step 104, and then the respective tables are identified, classified, and labeled with a table family ID, by using a supervised table classifier. While a supervised table classifier is used in the present examples, unsupervised table classifiers could be similarly used in various embodiments. Each table, which has been identified and classified with the table classifier, at step 106, is then flattened, at step 108, with respect to the identified table family's layout. Then, dependencies are discovered and computed, at step 110, for the flattened table. Finally, the flattened table is stored as an ABox data structure, at step 112, using a universal schema approach, together with its corresponding dependencies, that were discovered and computed at step 110. Optionally, additional meta-data (e.g., captions if available, header names, etc.) can be stored along with the ABox data structure for a table. A Resource Description Framework (RDF) data model is used in the examples discussed in this disclosure. However, other data models can be used according to other examples. The RDF data, from the ABox data structure, is stored, at step 114, in a triple-store 116 with support for search over triples (e.g., using search indexes). While RDF triples stored in a triple-store are used in the present examples, other types of data models and storage data structures may be used according to various embodiments. Lastly, a schema-less query API is deployed, at step 118, which receives a schema-less query and then searches the schema-less query over the triple store 116 to provide search results for the schema-less query.

After this overview of an example information processing system 100, the present disclosure will proceed to describe in more detail various aspects of the information processing system 100 and the new and novel method, according to various embodiments of the invention.

4.0—Compact Tables and Table Extraction

Tables within documents can be arbitrarily complex due to the free nature of publication layouts. Various embodiments of the present invention aim to tame some of this complexity, and particularly that complexity mainly arising from compact table layouts.

For the present discussion, we make the following observations: (a) Many tables that seem complex are in fact compact representations of much simpler and larger tables. (b) Compacting a simple (flat) but large table into a compact print-layout can be done by grouping repeated values together and using a combination of matrix layouts, spanning cells, and nested horizontal or vertical headers, for these grouped values. For example, FIG. 2B illustrates a table 230 which shows a matrix layout that groups table data by year and country and uses spanning cells to group quantity and value by year. FIG. 2A illustrates a table 200 that groups table data by internal and external thread fastener arranged as a matrix. (c) Some of these compact tables also include names for the values, which sometimes do not have an obvious correspondence to the values in the table.

The layout of compact tables is fairly regular. Within same-domain corpora, authors tend to compact their reference data in the same way. Moreover, some of these forms of compacting tables can be seen across corpora of different domains.

When people access compact tables, they unconsciously identify the keys for the table. However, identifying keys in compact layouts automatically is complicated due to the common practice of introducing column/row names in compact tables to provide hints of their semantics.

With these observations in mind, our first objectives are: 1) to be able to detect that a table has a compact layout, and 2) to expand the compact table. Doing so facilitates the analysis of the expanded table using traditional database analysis of the tables. Identifying keys and other dependencies, which comprise key steps in enabling query answering, are described in Section 6. We now describe both processes, starting with table expansion, to lay down some of the notions involved in detecting compact tables which are described in the next subsection.

4.1—Table Expansion (Flattening)

The objective of this table flattening step 108 is to transform a compact table layout (e.g., matrix, nested headers, etc.), into an expanded table representation that is closer to the relation (in the relational theory sense of the word) that the compact table represents. An example of an expansion algorithm, at step 108, is based on the assumption that every compact table layout can be seen as a matrix layout with three main areas, i.e., a pair of top and left areas that group values (e.g., may also be referred to as table meta-data or table header information), and a plain data area which holds the non-grouping values of the table (e.g., which may also be referred to as table data).

Intuitively, with reference to the table expansion example shown in FIG. 3, the expansion algorithm slides 308 a window called pivot window 306 over the main plain area of the table. This main plain area of the table contains table data values. At each step, the expansion algorithm produces an expanded row, as illustrated by the rows 404 shown in the expanded table 400 of FIG. 4, by merging the values in the pivot window 306 with the values in the horizontal-axis window 304 (the first grouping set of values) and the values in the vertical-axis window 302 (the second grouping set of values). Each row 404 in expanded table 400 in FIG. 4 includes the values in the horizontal-axis window 304 followed by the values in the vertical-axis window 302, and followed by the values in the pivot window 306.

The pivot window 306 slides 308 one step (one pivot window) at a time, together with the vertical-axis window 302. At each step, a new expanded row 404 is generated in the expanded table 400. When the end of the current compact row in the compact table 300 has been reached, the horizontal location of the pivot window 306 and the vertical window 302 is reset, and the vertical location of the pivot window 306 goes down by one step (one cell or one row in the compact table 300). The process is repeated until all of the table values in the compact table 300 have been scanned with the pivot window 306. A partial table expansion of the compact table 300 in FIG. 3 is provided in the expanded table 400 shown in FIG. 4. Note that non-matrix, horizontal tables are just a case of the more general matrix-layout in which there is no horizontal-axis window.

Note that expanding in this way, the expansion method may generate row values in the expanded table 400 which are not actual values. For example, in the expanded table 400 in FIG. 4, the table values of columns 3 and 6 are actually names (e.g., table header values or meta-data) for some of the table values of the original compact table 300 in FIG. 3. However, as will be more fully discussed in Section 6, this noise data is not problematic during query answering.

While the name of the expanded columns 402 is not critical for our query answering approach, according to the present example, the method tries to keep the corresponding names when possible. For hints on where to find the name of columns as well as the parameters of the expansion algorithm (e.g., window locations and sizes), according to various embodiments, the method uses the notion of table families, as described in the following section.

4.2—Table Families and Family Classification

As previously mentioned, an aspect to table expansion understands the layout of the table to be expanded. In particular, understanding which areas of the table are grouping values (e.g., also referred to as table meta-data or table headers) for expansion, which ones are plain values (also referred to as table data), etc. Obtaining this information, however, is a challenging task. As we previously mentioned, table layouts in documents can vary wildly. Tables in documents may contain nested tables, images, etc. This complexity is the reason why so many domain-specific table-mapping approaches exist. A practical solution to understand, identify, and classify table layouts will now be more fully described below.

We noted before that corpuses on the same domain tend to organize tables in similar ways. While the tables may not have exactly the same form, similar patterns appear. For example, the table in FIG. 2A is a table selected from a corpus of tables that contain combinations of values for nuts and bolts (external and internal fasteners). While these tables are individually different, they typically fall in the same pattern. All are matrix tables, with 4-6 horizontal header rows and 4-6 vertical header columns, and where the Nut/Bolt IDs determine the combination values (i.e., C codes), as well as the rest of the features of the nut and bolt. Other tables of the same type may vary in the number of horizontal and vertical header elements, but they all determine one single C code. We call this grouping of tables a table family or a table type, and the like.

Our approach to determine expansion values involves the following three steps: 1) identifying a set of table families that are of interest to the user, 2) setting the expansion parameters for each family in the set of table families, and 3) providing a straight forward mechanism to identify a table family associated with a particular table selected from a corpus of tables that includes the set of table families. Steps 1 and 2 are done on a per corpus basis, although, it is possible to define corpus independent families. For step 3, the present disclosure provides a machine learning approach that doesn't require manual annotation of tables, i.e., one of the most cumbersome, inefficient, and problematic tasks in traditional table-mapping approaches.

To classify tables into families, various embodiments of the invention leverage a supervised approach to train a classifier that can help identify the table families. The features used, according to the present example, are domain independent, e.g., number of row headers, number of column headers, number of repeated column header groups, whether a header contains spanning headers, and number of empty cells on upper left corner of the headers. For the purposes of identifying the header areas, according to the present example, first applied is a masking methodology to convert the cell values into masked form. In this masked form, continuous sets of digits are denoted as the character 'D', continuous sets of alphabetic characters are represented with the character 'A', and continuous sets of non-alphanumeric chars are represented with the character 'N'. For instance a header string "Eng FNU-52X" is converted into a masked form of "ANDA". An example of identifying masks for cells in a table 1500 is shown in FIG. 15. The letter strings pointed to by arrows from individual cells in the table 1500 show examples of masks identified for each individual cell from which the arrow originated.

Once the masking is applied on each column based on these rules, distinguishing patterns appear in each column. Typically in at least one column it can be observed a pattern change from the header part (e.g., from the meta-data) to the data part (to the actual data values in the table). In the data part of each column it can be checked whether there is one or more repeated patterns. If there is such a repeated pattern then it can be concluded that a table data part (as distinguished from table meta-data part) of the table starts at that particular row in the table. FIG. 16 illustrates a table 1600 which first has a mask applied, at step 1602, to each cell in the table followed by identification, at step 1604, of the header part and the data part of the table. The data part of the table 1600, at step 1604, is shown highlighted relative to the header part of the table 1600.

With identification of the cells that are the header part (meta-data) and the cells that are the data part (the actual table data values), feature extraction algorithm of a table classifier is able to determine the features of the table mentioned above. In total, according to the present example, nine table features are used to classify individual table families. Additionally, as illustrated in FIG. 12, an example list 1200 of nine table families can be used to identify which of each of the nine table families is associated with a particular table being analyzed from a corpus.

Figure 12:
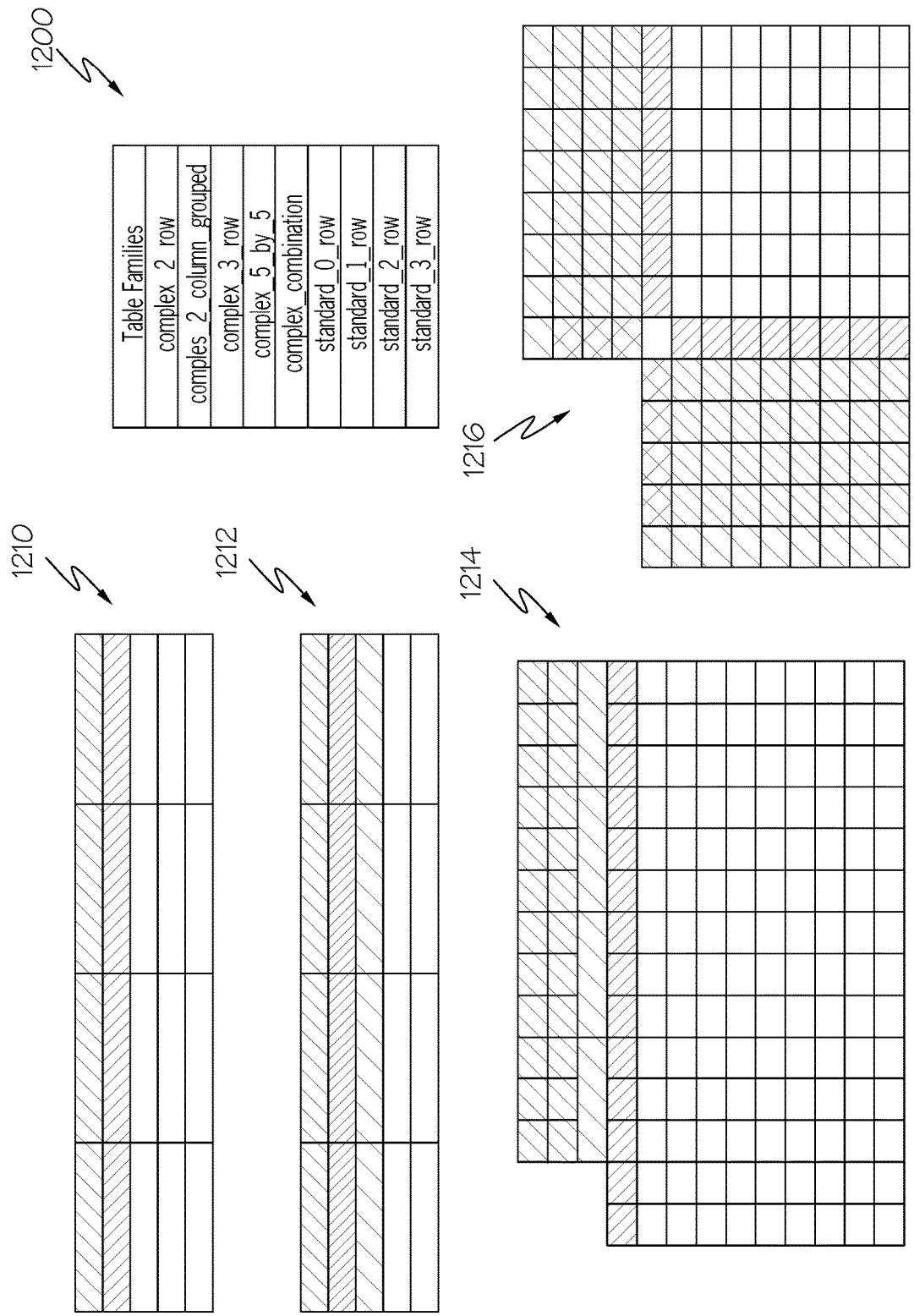
FIG. 12 is a list identifications of several example table families and several examples of listed table families are also shown.

Several examples of table families 1210, 1212, 1214, 1216, from the example list 1200 are shown in FIG. 12. The header part of each table family 1210, 1212, 1214, 1216, is highlighted in FIG. 12 to visually distinguish it from the data part of the respective each table family.

FIG. 17 illustrates an example of a feature extraction method that can be used by a table classifier, according to various embodiments of the invention. The masked cells in the table 1600 are shown, at step 1702. These masked cells are analyzed by a feature extraction algorithm of a table classifier, at step 1704, to identify the patterns for header part and for data part of the table 1600. An example of a feature vector table 1300 (as more completely shown in FIG. 13) is shown in FIG. 17 for use in identifying and classifying tables from a corpus. The feature vector table 1300, according to the example, includes nine feature vectors (which can be also referred to as nine features). The nine features are represented by nine columns from left to right in the feature vector table 1300. The tenth column (right-most column) in the feature vector table 1300 contains a label for each table associated with a table family and represented by a row in the feature vector table 1300.

For example, the first two features (e.g., left-most two columns in the feature vector table) 1706 classify a table by the number of row headers and the number of column headers. Other features found in the feature vector table are generally identified by the column headers of the feature vector table shown in FIG. 17. FIG. 14 shows a list 1400 of decision rules 2422 describing the nine features that can be used by the feature set extraction algorithm of the table classifier to identify how a table under analysis is associated with, according to one example implementation, one of seven (7) table families.

In experiments conducted by the inventors with access to a client-specific corpus including tables, seven (7) table families were used. For example, the table in FIG. 2A belongs to the table family identified as matrix-5-by-5-by-1. That is, a family of matrix tables with a pivot window of width 1 located in cell (5,5). The experiments used about 130 tables from the corpus for training purposes. Eighty-five percent (85%) of the tables were used for training the classifier models and fifteen percent (15%) of the tables were used for evaluation. From the publicly available Scikit library the experiments used the following classification algorithms to train the table classifier models: "Logistic Regression", "Linear Discriminant Analysis", "KNeighbors Classifier", "Decision Tree Classifier", "Gaussian naive Bayes", "SVC", "MLP Classifier", and "Random Forest Classifier". As a result of k-fold cross validation results, the inventors observed from the experiments that "Linear Discriminant Analysis", "Decision Tree Classifier", "Gaussian naive Bayes" and "Random Forest Classifier" classifiers perform quite well on the given training data set; very close to 1. Among these algorithms the inventors decided to utilize the Gaussian naive Bayes classifier since it performed slightly better than the other three classifiers.

5.0—ABox Description

Once the feature vectors of the tables are extracted and the tables are expanded, according to the present example, the method merges data and meta-data for all tables, into a single graph schema that enables structured query answering and indexing of all rows. The use of this schema for query answering will be more fully described in the next section. Now we proceed to describe the schema used with various embodiments of the invention.

Figure 5:
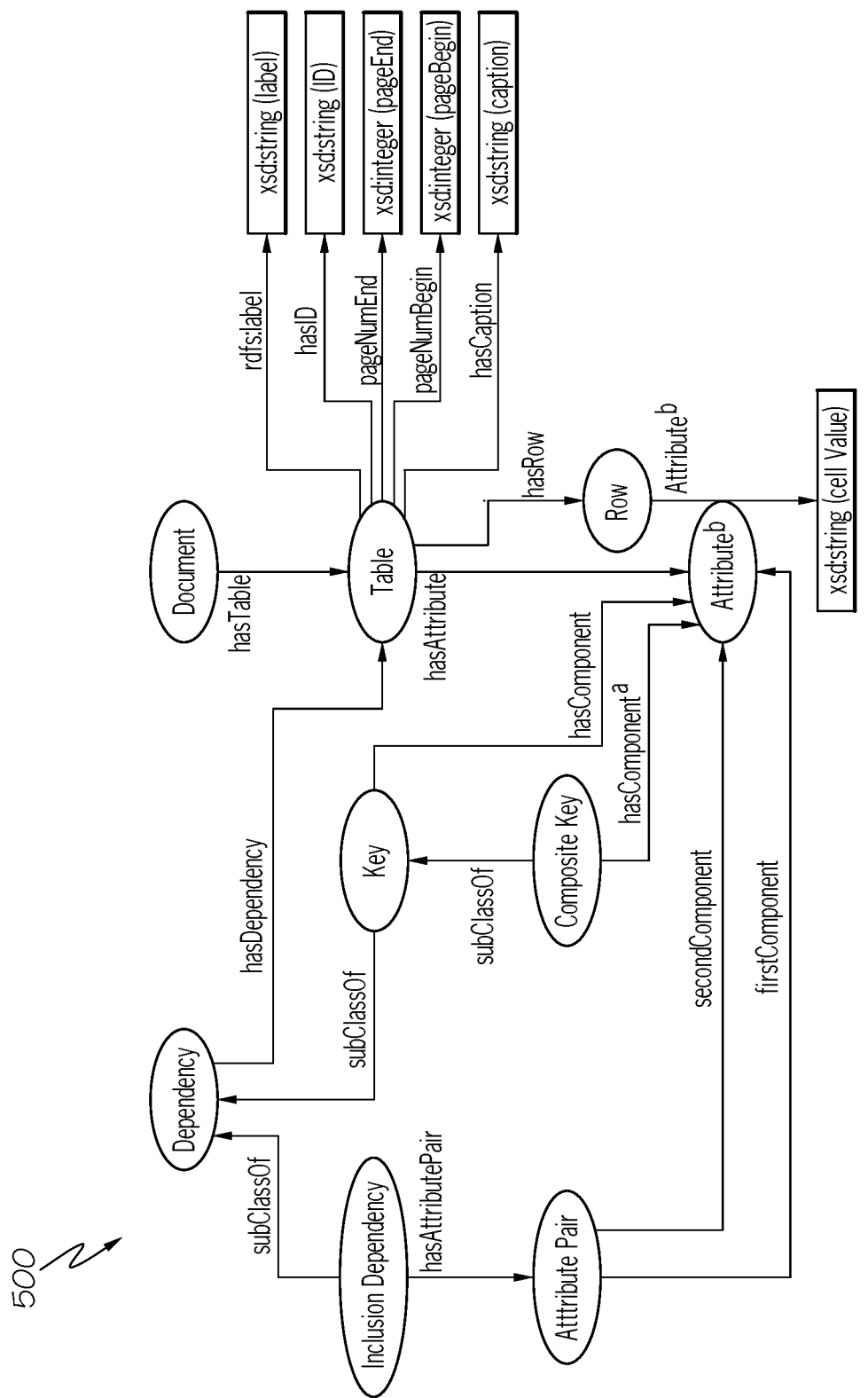
FIG. 5 is a data structure diagram showing an example of RDF types and properties.
Figure 6:
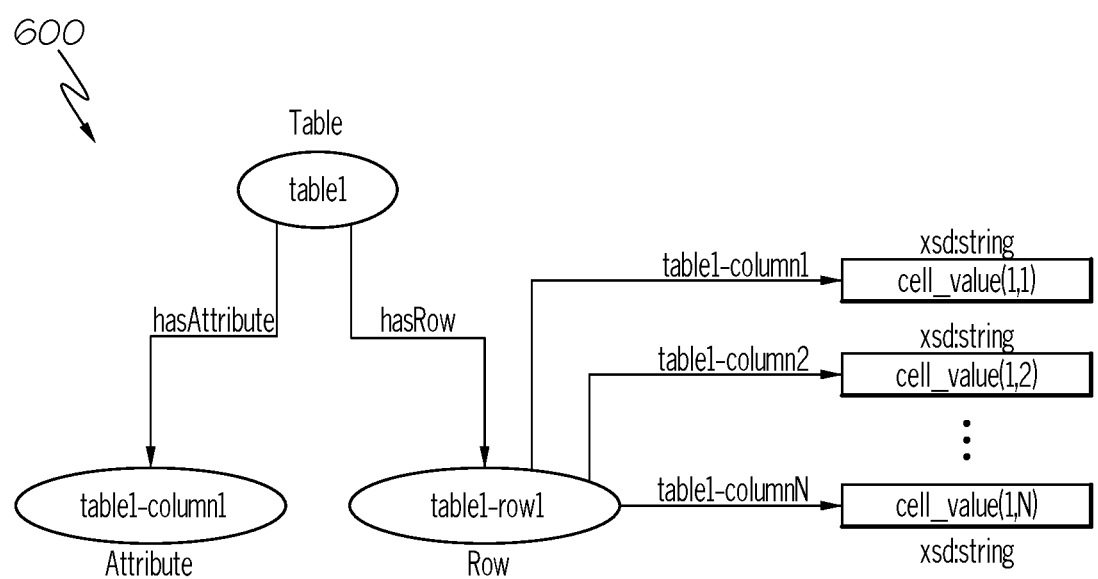
FIG. 6 is a data structure diagram showing an example of generating a set of A-boxes.

We divide the elements of this schema in two categories: the first one about the components that are given in the expanded tables (e. g. rows and columns) and the second one about the elements that are retrieved afterwards (e.g. dependencies and keys). An overview 500 of the RDF types and properties used in the examples discussed below, will be presented in the following two sections and summarized in FIG. 5. In FIG. 6, according to an example system implementation, a set of ABoxes 600 is generated for one row of an expanded table.

5.1—RDF Schema for Table Data

The following are various example classes (e.g., types) and properties for the objects that represent tables and their rows in our graphs: Document identifies objects that are documents, i.e., PDF source files that were previously ingested. They may be connected to one or more Table objects. Table identifies objects that are expanded tables, i.e., relational structures with attributes, rows and dependencies. Table objects are always associated with a Document object, one or more Attribute objects, one or more Dependency objects, and one or more Row objects. Attribute identifies object that are attributes, e.g. columns of tables. Attribute objects may or may not have a label (usually obtained from the header of the attribute); and Row identifies objects that are rows of a table and which will be associated to literals containing the values for each cell of the row in the expanded table.

The following are the properties we use to describe documents, tables and rows in our schema: hasTable connects a Document with zero or more Table objects; hasAttribute connects a Table object with one or more Attribute objects; has-Row connects a Table object with one or more Row objects; hasCaption connects a Table object with a xsd:string value; hasID connects a Table object with a xsd:string value; pageNumBegin connects a Table object with a xsd:integer value; pageNumEnd connects a Table object with a xsd:integer value; and has-ParentLabel connects an Attribute object with an xsd:string value.

5.2—RDF Schema for Dependencies

For each table, a set of all minimal keys are extracted for the table using existing methods and techniques. For all tables within a document, the inventive system and method can utilize inclusion dependencies to determine the relations between pairs of tables and to enable multi-table queries (more will be discussed in Section 6 below).

The following are the classes that can be used to define dependencies over a table object: Dependency identifies an object as a dependency; Key and CompositeKey are placeholders for a set of columns (attributes) that functionally determine the values of the rows in a table (Key has exactly one Attribute and CompositeKey has more than one Attribute); InclusionDependency is a placeholder for a set of pairs of columns. Each list contains a column in the current table and a column of another table (if the columns for the second table are part of a Key, then the inclusion dependency is also a foreign key); and AttributePair is a placeholder for a pair of Attribute objects, used to form foreign keys.

The following properties are used to describe dependencies in the example schema: hasDependency connects a Table object with one or more Dependency objects; hasComponent connects a Key object or CompositeKey object with Attribute objects; hasAttributePair connects a InclusionDependency objects with one or more AttributePair objects; and firstComponent and secondComponent connect a AttributePair object with an Attribute object.

6.0—Query Answering

The kind of queries envisioned are queries where a user does not need to know an underlying schema for stored data. The user only needs to specify some features of the data that she is looking for, such as values for some of the properties or the name/label of an object. The novel methods and techniques, according to various embodiments, find the relevant table or tables and provide a list of rows that best satisfy the query. An example of a straight forward and simple query language is illustrated in FIG. 7.

The fields in the input query are: table topics, a list of topics used to identify relevant tables based on their captions; projection, a list of string descriptors of the attribute(s) the user seeks a value for; and conditions, a list of (attr, val) pairs that indicate a selection criteria to arrive at a search result in terms of an attribute name and a value. Almost all parameters are optional, except values for conditions.

When answering queries, and example computer-implemented method translates the input query into a SPARQL query that searches (available in most triple-stores today) for the provided conditions over the rows and meta-data of all expanded tables in our graph. The results are ranked according to a scoring function based on the triple store's built-in search capabilities. The scoring function is constrained so that fuzzy matches are preferred over unmatched fields. The best method of composing a score for each row may depend on a particular application. An example method implementation, according to the present disclosure, uses a weighted sum calculation over the matching score for each field query. However, other methods can choose to use other forms of calculation to compose a score for each row.

Our WHERE clause specifies the type constraints on the ?row variable along with a ?table :hasRow ?row relation. If table topics is non-empty, the present example method can add an OPTIONAL construct attempting to match each aspect of the input query. For each attribute descriptor in the projection list this method creates a variable ?proj_i constrained to be an attribute in the table and attempts to match on its label. Finally, attr_i and val_i variables are created for each of the condition pairs by an OPTIONAL construct that constrains them to appear in the same row: ?row ?attr_i ?val_i. The matching score on their labels is computed in the same way as before.

FIG. 8 illustrates a translation of the query in FIG. 7 in which a user is attempting to learn the maximum torque value for a screw with diameter code 3A and combination code C2 for some unknown attribute in some table in the corpus.

6.1—Using Dependencies for Query Answering

In this section the problem of answering a user's query using dependency information across a set of tables will be discussed. An example method, according to an embodiment of the invention, can be used in several contexts and is particularly useful in scenarios in which we don't have explicit information about the structure of the schema that is underneath the given data and we want to enable answers to queries that require joining multiple tables.

After the tables have been expanded and indexed, dependencies in the form of keys or inclusion dependencies allow the system, according to various embodiments, to provide schema-less query methods that facilitate access to the data.

An input to the system is a set of expanded tables, for example the ones shown and discussed in Section 4, onto which has been added information about dependencies (see Section 5). In this context, dependencies and keys allow us to resolve complex queries on the table data. This scenario might occur when the input provided by the user's query is not sufficient to define a single answer and/or the query involves the contents of multiple tables. Dependencies are used to complete keys by recovering values that are not directly specified in the input but which can be retrieved using the values that are specified in the query. The system can use foreign dependencies (which define the relationship of a table column with respect to the columns of other tables) to connect data stored across multiple tables. Moreover, in the event where the initial query produces more than one unique solution, a system according to various embodiments of the invention can suggest the minimal set of parameters for which specifying a value would obtain a unique answer.

This method is applicable to tables and queries that involve answers from single tables or from multi-tables (e.g., queries that require joining two or more tables to compute an answer). The novel algorithm takes as input a collection of A-box triples regarding tables and their information regarding dependencies and keys. A system, according to various embodiments, pre-computes (offline) all the possible keys and foreign keys for each table. At run time, given an input query the system uses these pre-computed keys and dependencies (e.g., both dependencies expressly given in the collection of A-box triples and dependencies discovered by the system prior to receiving the input query) to search for the possible answer(s) to the query.

An example system may use the following steps: 1) The system checks if there exists at least one table that contains values that match the user query. In this case, the system returns the corresponding row(s) to the user as its answer. 2) If there does not exist any table that contains all the input query values, then the system will: 2a) identify the tables of interest and 2b) iterate over these tables, using both foreign dependencies and functional dependencies to try to recover the values of each key (in order) of the current table. This corresponds to the inference step; dependencies are used as logical rules trying to retrieve the key values. 2c) If it is possible to recover at least one key, then the system has found a solution and returns as search results the corresponding row(s) to the user. 2d) If there is no solution, then all the rows containing the input data are returned to the user (an incomplete solution).

A more detailed description of the algorithm used herein is presented in FIG. 9, Algorithm 1, QueryMultiTable, which uses QuerySingleTable from Section 6 to perform a SPARQL query (possibly on a particular table) for a row given a set of values. See also the example shown in FIG. 10, Algorithm 2.

It should be noted that this method is also applicable to object graphs and knowledge graphs, performing a projection of the data to a database (for example if each object is seen as a "row" and the values for its properties are seen as "row cells" or "row values"). Using the method and techniques, according to various embodiments of the invention, more efficient methods are provided for finding "long range" dependencies between objects in the graph and leveraging those dependencies to answer queries.

7.0—Evaluation

The approach presented here has been developed in the context of a project with a large industrial partner. The inventors used their use-case and data to show the feasibility and benefits of using an embodiment of the invention. We now proceed to describe this use-case.

Our industrial partner uses thousands of tables embedded within PDF documents. These tables are used as reference material by technicians in assembly lines and equipment maintenance locations. During their activities, technicians use these tables to look up information for their tasks. Given that these look-ups require either a physical search on a printed PDF document or a plain keyword search over the PDFs, finding the right information often requires minutes. Look-ups of this form are a routine operation, which summed up across all technicians in all locations of our client, amounts to thousands of hours per year for our partner.

Our objective is to reduce the cost of each of these individual look-ups by offering a structured query language that would allow users to query these documents similarly to the way they would query regular databases, but with very little knowledge of the schemas.

Our partner focused on two tasks, single-table retrieval, that is, retrieving information that lives in a single table; and multi-table retrieval, that is, retrieving information that requires consulting multiple tables.

An example of single-table query is, given an internal and external thread fastener such as ITF14 and ETF2, retrieve the corresponding combination code. This kind of query returns answers from tables similar to the one shown in FIG. 2A. There are hundreds of these tables within multiple documents.

A second example of single-table queries is given a diameter code of 8, and a combination value of C2, retrieve the minimum, nominal and maximum torque tolerance values. This kind of query has answers from tables similar to the one shown in FIG. 3. Similarly, there are hundreds of these tables, in multiple documents.

Finally, multi-table queries are of a form which is a combination of the previous queries, for example, given the codes for an internal and external thread fastener, ITF14 and ETF2, and a diameter code of 08, retrieve the minimum, nominal and maximum torque tolerance values. This kind of query requires the system to discover the need for joining two tables of the kind presented in FIGS. 2A and 3. See also the examples of single and multi-table queries shown in FIG. 11.

8.0—Summary Overview of an Example System Implementation According to Various Embodiments A machine learning based approach, according to various embodiments, enables custom training of classifier(s) for specific document corpuses and provides much higher precision when it comes to extraction of table content. The example system implementation discussed in this section 8.0 utilizes an approach that leverages machine learning methods for table classification and for flattening the classified table structures. The example system is different from any previously attempted system to extract data from tables. The system uses novel computer-implemented methods that can extract hierarchical headers from a table and then flatten them along with the table data into a transformed version of the table, by using a unique scrolling pivot-window-based approach. The machine learning based system, according to various embodiments, is particularly suited for processing large numbers of domain specific complex tables where extraction of knowledge from the complex tables is not trivial. Once the information is extracted, the system can also discover inclusion dependencies between data elements in different tables in the same corpus. With the discovered dependencies and the transformed and flattened tables, the system can support multi-table queries without necessarily having schema information about the tables known in advance to assist in searching the tables to answer the queries.

A system, according to various embodiments, uses the new and novel methods discussed herein to query data stored in tables within documents. Such methods require minimal effort from users and are able to handle tables that are of considerable complexity. The techniques used in this system, according to one example, exploit the flexibility of the RDF data model, the features of the SPARQL query language, and dependency theory. The computer-implemented methods described herein by the inventors have been tested and validated in the context of collaboration with a large industrial company.

It should be noted that these new system and methods, as described by examples herein, can be expanded to apply more complex data integration such as ontology-mapping techniques to integrate the schemas of the flat tables produced by the system. Table extraction and transformation, can be expanded beyond use of machine learning systems to use of deep learning systems to further generalize the methods described herein for family detection and/or discovery of the parameters for the flattening algorithms. Additionally, schema-less query answering with dependencies, can be expanded to the use of probabilistic dependencies that would allow these methods to more fully address noisy data, e.g., tables in which there are errors in the extraction process.

Example Operating Environment

Figure 24:
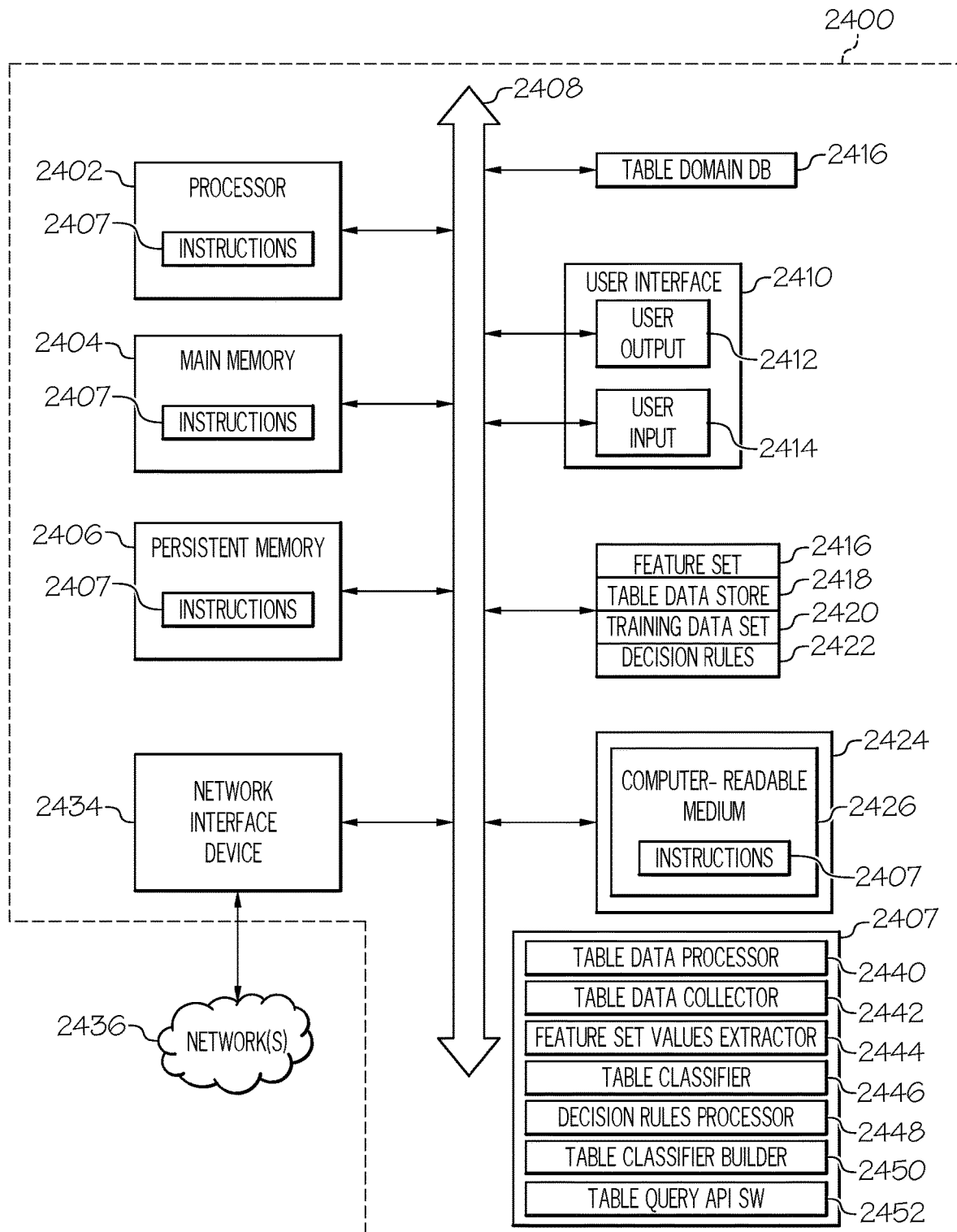
FIG. 24 is a block diagram illustrating an example of an information processing system suitable for use with various embodiments of the invention.

Referring to FIG. 24, a detailed view of an example information processing system 2400 is shown. This example information processing system 2400, according to various embodiments, is suitable for use in the information processing system 100 shown in FIG. 1 At least one processor 2402 is communicatively coupled with main memory 2404 and with persistent memory 2406. Persistent memory 2406 provides non-volatile storage of information used by the at least one processor 2402. Instructions, data, and configuration parameters, which can be individually or collectively also referred to as Instructions 2407, may be stored in the main memory 2404, the persistent memory 2406, and/or a computer readable medium 2426 that is readable via a computer interface device 2424 such as a disk drive or other computer interface device. According to the example, the information processing system 2400 comprises a computer system/server that includes a variety of computer readable media. Such media may be any available media that is accessible by the information processing system 2400, and which can include both volatile and non-volatile media, removable and non-removable media.

A bus or bus communication architecture 2408 is utilized by the information processing system 2400 to facilitate communication between the various components of the information processing system 2400. A table domain database 2416, according to the present example, is communicatively coupled with the processor 2402 via the bus communication architecture 2408. The table domain database 2416 comprises a repository that stores table data collected from a particular domain for use by the system 2400.

Bus 2408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A user interface 2410 provides a user output interface 2412 and a user input interface 2414. The user output interface 2412 includes, according to the present example, a display, and audio output interface such as one or more speakers, and various indicators such as visual indicators, audible indicators, and haptic indicators. A user input interface 2414 includes, according to the present example, a keyboard, a mouse or other cursor navigation module such as a touch screen, touch pad, a pen input interface, and a microphone for input of audible signals such as user speech, data and commands that can be recognized by the processor 2402

In this example, a memory repository includes storage of a set of features 2416, storage of table data in a triple store data structure 2418 that is used by the system 100, 2400, a training data set 2420, and a set of decision rules 2422. The system 100, 2400 ingests raw document(s) from a particular domain, transforms ingested PDF documents to HTML format as necessary, and stores the raw document data in HTML format in the table domain database 2416. The stored HTML documents can include many different types of tables.

The system 2400 extracts the tables from the stored HTML documents and generates a JSON representation in a JSON document database in the table domain database 2416 in which the information processing system 2400 may additionally do some minor normalization of the stored table data (e.g., remove spanning cells).

The feature set 2416, the table data store 2418, the training data set 2420, and the set of decision rules 2422, are stored, according to the example, in persistent memory. This data stored for use by the processor 2402, operating in response to the Instructions 2407, will be discussed in more detail below.

The Instructions 2407, according to the present example, include a table data processor 2440, a table data collector 2442, a feature set values extractor 2444, at least one table classifier 2446, a decision rules processor 2448, and a table classifier builder 2450. A network interface device 2434 communicatively couples the information processing system 2400 with one or more networks 2436, which may include any one or more of the following: wired networks, wireless networks, local area networks, and wide area networks which may include the Internet, for facilitating communication with other computing/processing devices and/or information processing systems.

With reference to both FIG. 27 and FIG. 1, next will be described several operations and functions of a portion of the example information processing system 100, 2400. The system 2400 ingests raw document(s) from a particular domain, transforms ingested PDF documents to HTML format as necessary, and stores the raw document data in HTML format in the table domain database 2416. The stored HTML documents can include many different types of tables.

The table data processor 2440, interoperating with the table data collector 2442 and other components in the information processing system 2400, extracts the tables from the stored HTML documents and generates a JSON representation in a JSON document database in the table domain database 2416 in which the information processing system 2400 may additionally do some minor normalization of the stored table data (e.g., remove spanning cells).

The table data collector 2442, as used in this example, operates according to the novel masking methodology described above to identify table cells that contain actual table data as distinguished from table cells that contain table meta-data such as table header information. Masking is applied to each individual cell in a table. A clear pattern difference is highlighted by using this masking methodology which distinguishes table cells that contain actual table data from table cells that contain table meta-data such as table header information. As an example, see FIG. 15, in which the letter strings pointed to by arrows originating from individual cells in the table 1500 show examples of masks identified for each individual cell from which the arrow originated. FIG. 16 illustrates a table 1600 which first has a mask applied, at step 1602, to each cell in the table followed by identification, at step 1604, of the header part and the data part of the table. The data part of the table 1600, at step 1604, is shown highlighted relative to the header part of the table 1600.

With identification of the cells that are the header part (meta-data) and the cells that are the data part (the actual table data values), the feature set values extractor 2444 interoperates with at least one table classifier 2446 according to a feature extraction algorithm of the table classifier 2446. The feature set values extractor 2444 is able to determine the values of the features extracted from analyzing the table mentioned above. FIG. 17 illustrates an example of a feature extraction method that can be used by the feature set values extractor 2444 of the table classifier 2446, according to various embodiments of the invention. The decision rules processor of the table classifier 2446, with reference to the decision rules 2422, analyzes a table to detect the presence of predetermined features in the table. The features are selected from the set of features 2416.

For example, the masked cells in the table 1600 (see FIG. 16) are shown, at step 1702 (see FIG. 17). These masked cells are analyzed by the feature set values extractor 2444 interoperating with the decision rules processor 2448, at step 1704, to identify the patterns for header part and for data part of the table 1600. An example of a feature vector table 1300 (as more completely shown in FIG. 13) is shown in FIG. 17 for use in identifying and classifying tables from a corpus. The feature vector table 1300, according to the example, includes nine feature vectors (which can be also referred to as nine features or a set of nine features). The nine features are represented by nine columns from left to right in the feature vector table 1300. The tenth column (right-most column) in the feature vector table 1300 contains a label (annotation) for each table associated with a table family and represented by a row in the feature vector table 1300.

In total, according to the present example, nine table features are used to classify individual table families. Additionally, as illustrated in FIG. 12, an example list 1200 of nine table families can be used to identify which of each of the nine table families is associated with a particular table being analyzed from a corpus.

According to various embodiments, the features of the tables, such as the number of row and column headers, are extracted from tables, at step 104. The table classifier 2446 then identifies, classifies, and labels, the respective tables are with a table family ID, by using a supervised table classifier method. While a supervised table classifier 2446 is used in the present example, unsupervised table classifiers could be similarly used in various embodiments. Each table, which has been identified and classified with the table classifier 2446, at step 106, is then flattened, at step 108, with respect to the identified table family's layout. The table flattening step 108 according to the example transforms a compact table layout (e.g., matrix, nested headers, etc.), into an expanded table representation that is closer to the relation (in the relational theory sense of the word) that the compact table represents. An example of an expansion algorithm, at step 108, has been discussed above with reference to table 300 shown in FIG. 3. According to the example, the table data processor 2440 expands the compact table 300 resulting in the expanded (flattened) table 400.

The table data processor 2440 then proceeds to discover and compute (map) table dependencies, at step 110, for the flattened table 400. An example of a novel method for discovering dependencies in flattened tables has been discussed above. A dependency is a logical implication between columns of one or more relations (flat tables). Dependencies formally describe the ways in which data is arranged in relations. As has been discussed above, at least two classes of dependencies can be readily discovered and mapped by the table data processor 2440 analyzing the one or more flattened tables, according to the present example.

Figure 18:
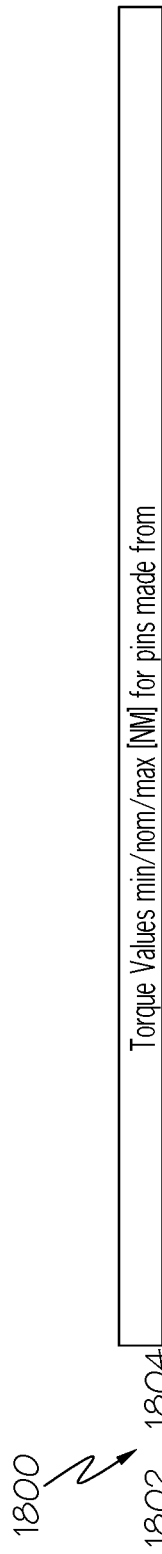
FIG. 18 is an example of a table illustrating functional dependency.

One type of dependencies is functional dependencies. An example of this type of functional dependency is illustrated in the table 1800 shown in FIG. 18. The two columns identified by headers Dia. Code 1802 and Dia. [mm] 1804 are interrelated by functional dependencies between data values in each of the two columns 1802, 1804, in the table 1800. A second example, illustrating use of keys, is shown in FIGS. 19 and 20. The table 1800, as shown in FIGS. 18 and 19, includes the two columns identified by headers Dia. Code 1802 and Dia. [mm] 1804. The table 1800 also includes a set of column headers 1902 identifying C values C1, C2, C3, C4, and C5. These headers represent keys identifying dependencies. That is, for example, the headers Code 1802 and the set of C values 1902 represent a first key. Additionally, the headers Dia. [mm] 1804 and the set of C values 1902 represent a second key. Table 1800, as converted by a flattening algorithm according to various embodiments of the invention, is shown, in part, as a flattened table 2000 in FIG. 20. The left-most column in the table 2000 has data values 2002 identified by Header 0. These data values 2002 under Header 0 correspond to data values for the first key. The data values 2006 in the column identified by Header 4 also correspond to data values for the first key. It can be seen in table 2000 that the row values 2002 under column Header 0 are functionally related to the row values 2006 under column Header 4. In similar fashion, it can be seen in table 2000 that the row values 2004 under column Header 1 are functionally related to the row values 2006 under column Header 4. These relationships can readily be discovered and mapped by an information processing system using the flattened table 2000 to indicate opportunities for searching the compact table 1800 shown in FIGS. 18 and 19.

Figure 21A:

Another type of dependencies is inclusion dependencies. An example of this type of inclusion dependency between two compact tables is illustrated in the two tables respectively shown in FIGS. 21A and 21B. A first table 2100 shown in FIG. 21A, according to the example, includes a set of column headers identifying C values C1, C2, C3, C4, and C5. The column header for C3 2102, which includes thereunder three sub-columns with headers Min, Nom, Max, can be used as a foreign key that maps the column header C3 in this first table 2100 shown in FIG. 21A with data values C3 2104 in the second table shown in FIG. 21B. That is, C values in either table can be mapped, as a multi-table inclusion dependency, to C values in the other related table. FIGS. 22A and 22B show two tables 2202, 2204, that represent the flattened tables 2202, 2204, converted from the compact tables shown in FIGS. 21A and 21B, respectively. The C values 2206 under the column Header 4 in the first flattened table 2202 can be mapped to the C values 2208 under the column Header 10 in the second flattened table 2204. It can be seen in the flattened tables 2202, 2204, that the row values 2006 under column Header 4 of the first table 2202 are related by inclusion dependencies to the row values 2008 under column Header 10 in the second table 2204. These relationships can readily be discovered and mapped by an information processing system using the flattened tables 2202, 2204, to indicate opportunities for searching the compact tables shown in FIGS. 21A and 21B.

Continuing with the description of operations and functions of a portion of the example information processing system 100, 2400, the flattened table, together with its corresponding dependencies that were discovered and computed at step 110, is stored in the table data store 2418 as an ABox data structure, at step 112, using a universal schema approach. Optionally, additional meta-data (e.g., captions if available, header names, etc.) can be stored along with the ABox data structure for a table. The table data processor 2440, at step 114, then collects and organizes the table data using a Resource Description Framework (RDF) data model. The table data processor 2440 then stores the table data in the table data store 2418 in a triple-store 116 with support for search over triples (e.g., using search indexes) from a table query API software library 2452.

Lastly, the information processing system 100, 2400, includes a schema-less query API software library 2452 which, at step 118, can receive, via the user input interface 2414, schema-less queries from users and then the information processing system 100, 2400, searches the schema-less query over the triple store 116, 2418, to provide, via the user output interface 2412, search results in response to the schema-less query. According to one example, a user interface 2410 includes a keyboard and a mouse in the user input interface 2414 and a display monitor in the user output interface 2412. In this way, as one example, the information processing system 100, 2400, receives the schema-less query from a user via the keyboard and a mouse and, in response, displays the search results via the display monitor. There are many different ways that a user interface may be used to exchange information with users of the information processing system 100, 2400.

Figure 23B:
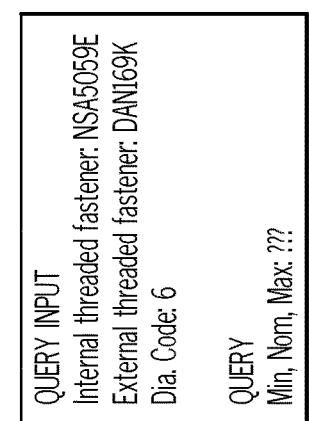

An example schema-less query entered by a user via the keyboard and a mouse is illustrated in FIGS. 23A and 23B. The user query input can be contemporaneously displayed on the display monitor of the information processing system 100, 2400, as illustrated by the rectangle 2302 shown in FIG. 23B. As has been discussed above with reference to FIGS. 21A, 21B, 22A, and 22B, the information processing system 100, 2400, has extracted table data from the compact tables shown in FIGS. 21A and 21B, and converted these compact tables to flattened tables 22A and 22B. Dependencies have been discovered and mapped and the data organized in the triple store 116, 2418, ready to be used by the information processing system 100, 2400, to search the schema-less query illustrated by the rectangle 2302 shown in FIG. 23B.

The keys for the table 2202 are ["Diameter code", "C code"] that can give us the "Torque value Min/Nom/Max", and ["Diameter mm", "C code"] that can give us the "Torque value Min/Nom/Max". Since the information processing system 2400 wants to compute the "Torque value Min/Nom/Max" the system determines it needs the value for one of the two keys: ["Diameter code", "C code"] that can give us the "Torque value Min/Nom/Max" and ["Diameter mm", "C code"] that can give us the "Torque value Min/Nom/Max".

The information processing system 100, 2400, tries to use the first key since the query 2302 provided this element: {"attribute topic": "Diameter code", "value":"6"} 2312. The system 2400 can use the predetermined dependency ["Diameter code", "C code"] which maps to "Torque value Min/Nom/Max").

The system 2400 needs the "C code", but this information is not provided by the received query 2302. The system 2400 then can follow the foreign dependencies that lead from a C3 value 2308 in the second table shown in FIG. 23B to the column header C3 2310 in the table shown in FIG. 23A. That is, the keys ["External threaded fastener", "Internal threaded fastener"] map to "C code". The system 2400 in this way determines all the elements needed to search the query 2302 to return a unique answer for the torque value 2314 in the table shown in FIG. 23A. The answer to the query can be displayed on the display monitor as "Torque value Min/Nom/Max"=(10.6, 12.2, 13.8). This is only one simple example of processing a schema-less query 2302 by the information processing system 100, 2400, to search the query 2320 using table data from the tables shown in FIGS. 23A and 23B, and thereby present on the display monitor the search results to the query 2302.

Example of a Table Classifier Builder

The classifier builder 2450 can comprise any commercially available tool for building the model for the table classifier 2446. The model can include one or more predictive models. A predictive model provides the decision rules 2422 and the probabilities that a table under analysis is a member of one of the known set of table families given the feature values determined from the training data set 2420. Feature values can be obtained, for example, through empirical observation of the training data set 2420, or extracted by the system from training table data. A probability can be calculated that a future observed set of feature values identifies the table under analysis is likely a member of a particular table family selected from a set of known table families, based on the observed feature values and compared against a threshold value. If the probability is greater than the threshold, the table is labeled (annotated) as a particular type of table family. An example has been discussed above for a process of determining from extracted feature values, how a table can be categorized as a type of table.

According to various embodiments, from a set of features defined initially based on an analysis of a table corpus with supervision by experts, training data is generated. The training data is labeled as a type of table based on the table data that has are already been identified. A classifier 2446 is then built by the table classifier builder 2450, under expert supervision, using the classification training data set 2420. A predictive model and decision rules 2422, as one example, can be generated in terms of the feature values derived from the model of the classifier 2446.

The table classifier 2446 that is built by the table classifier builder 2450 can be used by the information processing system 100, 2400 to help identify tables from a corpus. The table classifier 2446 can include, according to various embodiments, a predictive model and one or more decision rules 2422, which are processed with the decision rules processor 2448, to analyze for each table under analysis the collected and extracted feature values to determine whether the table can be classified as one table type (or family) selected from a set of known table types (known table families). According to the present example, if the classifier 2446 determines that the collected table data identifies a particular table family, then the extracted feature values and collected table data are captured and stored in the training data set 2420, as a training data set identified as a particular table family. That is, for example, a training data set 2420 can be updated with collected table data and feature values that identify a particular table family, which results in an updated training data set stored in memory. The table classifier builder 2450 can re-build the model and decision rules of the table classifier taking into consideration the updated training table data. In this way, the information processing system 100, 2400, learns to better improve the accuracy and reliability of decisions made with the table classifier 2446.

In summary, according to the example, training table data can be stored in a training data set repository 2420 in persistent memory. Based on this training table data, a table classifier builder 2450 can build a table classifier 2446, with a predictive model and decision rules, based on the training table data.

Example Methods for Tracking and Updating Dependency Information for Tables

A number of possible dependencies between tables and parts of tables can be significant. Since tracking dependencies has overhead, it can be desirable to limit the number of dependencies which are tracked. In order to limit the amount of dependency information which needs to be maintained, a system according to various embodiments can maintain information on the type of queries users typically make. Based on the types of queries, the system can determine which dependencies to maintain. For example, suppose that table A is accessed frequently. Then it would be advisable to maintain dependencies for table A. If, on the other hand, table B is not accessed frequently, then it may be less important to maintain dependency information for table B. More specifically, suppose that column X of table A is accessed more frequently than column Y of table A. Then it may be more desirable to maintain dependency information for column X of table A than for column Y of table A.

Figure 25:
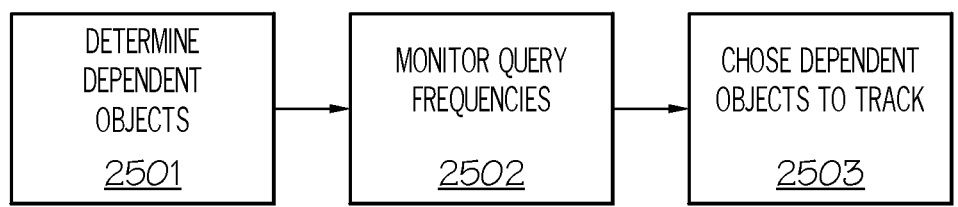
FIG. 25 depicts an example of a method for determining which dependent objects to track.

FIG. 25 illustrates an example method. In step 2501, the system determines which tables and parts of tables comprise dependent objects. Dependent objects comprise tables or parts of tables for which dependencies can be determined. For example, a dependent object could be an entire table, a column of a table, a row of a table, etc. Step 2501 is typically application dependent, as the requirements of the application determine what dependencies are useful to track.

In step 2502, the system monitors dependent objects to determine how frequently they are accessed. Step 2502, according various embodiments, can be continuously repeatedly operating in a background process. In this case, access frequencies determined in step 2502 could be constantly changing. A key point is that dependent objects which are accessed more frequently are often more desirable candidates for maintaining dependency information.

In step 2503, the example system determines for which dependent objects to compute dependency information. It biases the selection in favor of more frequently accessed dependent objects. For example, an access threshold frequency can be maintained. If a dependent object has an access frequency above the threshold, dependency information for the dependent object is maintained. If the access threshold frequency falls below the threshold, dependency information for the dependent object is not maintained.

The access frequency for a dependent object o1, for example, can change over time. It may be the case that dependency information for the object o1 is being maintained due to its access frequency exceeding the threshold at some time t1. At a later time t2, the system determines in step 2503 that the access frequency for object o1 has fallen below the threshold. At that stage, the system might stop maintaining dependency information for object o1.

Dependency information can be maintained in persistent storage so that it is preserved in the event of system failures. Alternatively, it can be maintained in main memory where it can be accessed more quickly. One option is for the system to have a copy of the dependency information maintained in persistent storage where it would be preserved in the event of a system failure and another copy of the dependency information cached in main memory where it can be accessed more quickly.

The process depicted in FIG. 25 can execute multiple times over a period of time, as access frequencies for dependent objects can change. In this case, dependency information for a dependent object can be maintained at different times, depending upon the changing access frequency for the dependent object.

When data in a table changes, dependency information can become obsolete. If there are a lot of tables and dependencies, calculating updated dependencies can entail significant overhead. The system, according to the example, provides the ability to limit computations for updating dependency information. The system, for example, does not have to update dependency information after every change to a table is detected. Instead, the system can batch updates so that dependency information is only recalculated after multiple table updates. A system, for example, can provide the following options for updating dependency data:

Update dependency information before the number of updates to tables exceeds n, for a positive integer n.

Update dependency information before it may be obsolete for a time period exceeding a threshold t. For example, suppose that the first possible update to a table after the dependency information is known to be current occurs at time s. Then, the dependency information should be updated no later than time t+s.

Figure 26:
FIG. 26 depicts an example of a method for determining frequencies for updating dependency information.

The system, according to the example, also has methods to limit the number of dependencies which are updated at any given time. A key point is that it is often more important to maintain dependencies for dependent objects which are more frequently accessed than those which are less frequently accessed. FIG. 26 depicts an example method for determining frequencies for updating dependency information.

In step 2601, the system, according to the example, determines dependent objects to track and frequencies with which these dependent objects are accessed by queries. The system can use the method depicted in FIG. 25 to determine this information.

In step 2602, the system, according to the example, orders the dependent objects being tracked by access frequencies. A balanced tree is a good data structure to use here, as operations can be performed in O(log(n)) time. Other data structures, such as lists, can be used instead of balanced trees. A list is likely to have higher overhead, as operations may take O(n) time.

In step 2603, the system, according to the example, determines frequencies for updating dependency information. Dependency information for more frequently accessed dependent objects is generally updated more frequently. There are multiple methods the system can provide, including but not limited to, the following:

A fixed number of update frequencies, n, are assigned to dependent objects. For example, if n=5, then we assign five (5) different update frequencies. More frequently accessed dependent objects are assigned a higher update frequency. One option is to assign approximately or exactly ⅕ of dependent objects to each update frequency. Other methods which assign different fractions of dependent objects to update frequencies are also possible.

The update frequency of a dependent object is proportional to the frequency with which the dependent object is accessed.

The update frequency monotonically increases as a function of the frequency with which the dependent object is accessed.

The update frequency monotonically increases, or stays the same, as a function of the frequency with which the dependent object is accessed.

Dependent objects with an access frequency above a threshold t1 are updated with a frequency at least f1, while dependent objects with an access frequency below t1 are updated with a frequency not exceeding f2, where $0<=f2<f1$.

The example process depicted in FIG. 26 can execute multiple times over a period of time, as access frequencies for dependent objects can change. In this case, dependency information for a dependent object can be updated with different frequencies, depending upon the changing access frequency for the dependent object.

NON-LIMITING EXAMPLES

The present invention may be a system, a method, and/or a computer program product. The computer program product may include a computer readable storage medium (or media) having computer readable program instructions thereon for causing a processor to carry out aspects of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer readable program instructions described herein can be downloaded to respective computing/processing devices from a computer readable storage medium or to an external computer or external storage device via a network or networks, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems), and computer program products according to embodiments of the invention. It will be understood that each block of the flowchart illustrations and/or block functional diagrams, and combinations of blocks in the flowchart illustrations and/or block functional diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or functional block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the computer readable storage medium is shown in an example embodiment to be a single medium, the term "computer readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methods of the subject disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a computer-readable storage medium, as listed herein and including art-recognized equivalents and successor media, in which the software implementations herein are stored.

Although the present specification may describe components and functions implemented in the embodiments with reference to particular standards and protocols, the disclosure is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor is illustrated for an information processing system, information processing systems with multiple CPUs or processors can be used equally effectively. Various embodiments of the present disclosure can further incorporate interfaces that each includes separate, fully programmed microprocessors that are used to off-load processing from the processor. An operating system (not shown) included in main memory for the information processing system may be a suitable multitasking and/or multiprocessing operating system, such as, but not limited to, any of the Linux, UNIX, Windows, and Windows Server based operating systems. Various embodiments of the present disclosure are able to use any other suitable operating system. Various embodiments of the present disclosure utilize architectures, such as an object oriented framework mechanism, that allows instructions of the components of operating system (not shown) to be executed on any processor located within the information processing system. Various embodiments of the present disclosure are able to be adapted to work with any data communications connections including present day analog and/or digital techniques or via a future networking mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop personal computer (laptop PC), a tablet computer, a smart phone, a mobile phone, a wireless communication device, a personal digital assistant, a workstation, and the like. A processing system may include one or more processing systems or processors. A processing system can be realized in a centralized fashion in one processing system or in a distributed fashion where different elements are spread across several interconnected processing systems.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

What is claimed is:

1. In a computer system comprised of a memory repository in which is stored a set of tables and a processor communicatively coupled to the memory repository and thereby to the stored set of tables, a computer-implemented method for maintaining dependency information among the set of tables, the method comprising:
   providing a set of flattened tables stored in a memory repository in a computer system, each flattened table in the set of flattened tables including table data and table meta-data converted from a compact table collected from a corpus of documents, the set of flattened tables organized to be searchable by schema-less queries;
   determining a plurality of dependent objects in the set of flattened tables, wherein a dependent object comprises all or part of a flattened table in the set of flattened tables, and wherein the processor maintains and updates dependency information stored in the memory repository, the stored dependency information maps dependency between dependent objects in the plurality of dependent objects in the set of flattened tables thereby organized to be searchable by schema-less queries, and wherein a frequency of access is stored in memory for each dependent object in the plurality of dependent objects;
   determining a frequency of access for each of the plurality of dependent objects;
   in response to an access frequency of a dependent object exceeding a threshold, maintaining and updating dependency information corresponding to the dependent object stored in the memory repository; and
   in response to the access frequency for the dependent object falling below the threshold, ceasing to maintain dependency information for the dependent object stored in the memory repository.

2. The method of claim 1, further comprising:
   maintaining a first copy of said dependency information in persistent storage and maintaining a second copy of said dependency information in main memory.

3. The method of claim 1, further comprising:
using the frequency of access for each of the plurality of dependent objects to determine a frequency of updating dependency information for each of the plurality of dependent objects.

4. The method of claim 3, further comprising:
assigning a fixed number of update frequencies to the plurality of dependent objects.

5. The method of claim 3, wherein a frequency of updating dependency information for a dependent object is proportional to a frequency of access for the dependent object.

6. The method of claim 3, wherein a frequency of updating dependency information for dependent objects monotonically increases with a frequency of access for the dependent objects.

7. The method of claim 3, wherein a frequency of updating dependency information for a first dependent object with a frequency of access above a threshold is higher than a frequency of updating dependency information for a second dependent object with a frequency of access below the threshold.

8. In a computer system comprised of a memory repository in which is stored a set of tables and a processor communicatively coupled to the memory repository and thereby to the stored set of tables, a computer-implemented method for determining frequencies for updating dependency information among the stored set of tables, the method comprising:
providing a set of flattened tables stored in a memory repository in a computer system, each flattened table in the set of flattened tables including table data and table meta-data converted from a compact table collected from a corpus of documents, the set of flattened tables organized to be searchable by schema-less queries;
determining a plurality of dependent objects in the set of flattened tables, wherein a dependent object comprises all or part of a flattened table in the set of flattened tables, and wherein the processor maintains and updates dependency information stored in the memory repository, the stored dependency information maps dependency between dependent objects in the plurality of dependent objects, and wherein a frequency of access is stored in memory for each dependent object in the plurality of dependent objects;
determining a frequency of access for each of the plurality of dependent objects; and
based on the frequency of access for each of the plurality of dependent objects determine a frequency of updating dependency information for the respective each of the plurality of dependent objects.

9. The method of claim 8, further comprising assigning a fixed number of update frequencies to the plurality of dependent objects.

10. The method of claim 8, wherein a frequency of updating dependency information for a dependent object is proportional to a frequency of access for the dependent object.

11. The method of claim 8, wherein a frequency of updating dependency information for dependent objects monotonically increases with a frequency of access for the dependent objects.

12. The method of claim 8, wherein a frequency of updating dependency information for a first dependent object with a frequency of access above a threshold is higher than a frequency of updating dependency information for a second dependent object with a frequency of access below the threshold.

13. The method of claim 8, further comprising:
maintaining a first copy of said dependency information in persistent storage and maintaining a second copy of said dependency information in main memory.

14. A non-transitory computer readable storage medium, comprising computer instructions which, responsive to being executed by a processor in a computer system comprised of a memory repository in which is stored a set of tables and the processor being communicatively coupled to the memory repository and thereby to the set of tables, cause the processor to perform a method for maintaining dependency information among the set of tables, the method comprising:
providing a set of flattened tables stored in a memory repository in a computer system, each flattened table in the set of flattened tables including table data and table meta-data converted from a compact table collected from a corpus of documents, the set of flattened tables organized to be searchable by schema-less queries;
determining a plurality of dependent objects in the set of flattened tables, wherein a dependent object comprises all or part of a flattened table in the set of flattened tables, and wherein the processor maintains and updates dependency information stored in the memory repository, the stored dependency information maps dependency between dependent objects in the plurality of dependent objects in the set of flattened tables thereby organized to be searchable by schema-less queries, and wherein a frequency of access is stored in memory for each dependent object in the plurality of dependent objects;
determining a frequency of access for each of the plurality of dependent objects; and
in response to an access frequency of a dependent object exceeding a threshold, maintaining and updating dependency information corresponding to the dependent object stored in the memory repository.

15. The non-transitory computer readable storage medium of claim 14, the method further comprising: ceasing to maintain dependency information for the dependent object in response to the access frequency for the dependent object falling below the threshold.

16. The non-transitory computer readable storage medium of claim 14, the method further comprising: maintaining a first copy of said dependency information in persistent storage and maintaining a second copy of said dependency information in main memory.

17. The non-transitory computer readable storage medium of claim 14, the method further comprising: using the frequency of access for each of the plurality of dependent objects to determine a frequency of updating dependency information for each of the plurality of dependent objects.

18. The non-transitory computer readable storage medium of claim 17, the method further comprising: assigning a fixed number of update frequencies to the plurality of dependent objects.

19. The computer readable storage medium of claim 17, wherein a frequency of updating dependency information for a dependent object is proportional to a frequency of access for the dependent object.

* * * * *